United States Patent
Sako et al.

(10) Patent No.: US 9,881,402 B2
(45) Date of Patent: Jan. 30, 2018

(54) IMAGE PROCESSOR AND STORAGE MEDIUM

(71) Applicant: SONY CORPORATION, Tokyo (JP)

(72) Inventors: Yoichiro Sako, Tokyo (JP); Hiroyuki Hanaya, Kanagawa (JP); Kazunori Hayashi, Tokyo (JP); Yasunori Kamada, Kanagawa (JP); Takatoshi Nakamura, Tokyo (JP); Tomoya Onuma, Shizuoka (JP); Akira Tange, Tokyo (JP); Takayasu Kon, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/243,127

(22) Filed: Apr. 2, 2014

(65) Prior Publication Data
US 2014/0300633 A1 Oct. 9, 2014

(30) Foreign Application Priority Data
Apr. 9, 2013 (JP) ................................ 2013-081081

(51) Int. Cl.
| G06T 11/60 | (2006.01) |
| G06K 9/78 | (2006.01) |
| G06K 9/00 | (2006.01) |

(52) U.S. Cl.
CPC .......... G06T 11/60 (2013.01); G06K 9/00671 (2013.01)

(58) Field of Classification Search
CPC ....... G06T 11/60; G06K 9/78; G06K 9/00671
See application file for complete search history.

(56) References Cited

U.S. PATENT DOCUMENTS

| 2003/0038884 A1* | 2/2003 | Matsushita ........ H04N 1/32144 348/211.5 |
| 2003/0070145 A1* | 4/2003 | Barnes ................... G06Q 30/02 715/209 |
| 2008/0201638 A1* | 8/2008 | Nair ........................ H04L 67/38 715/706 |
| 2010/0315491 A1* | 12/2010 | Carter et al. .................... 348/51 |
| 2011/0028207 A1* | 2/2011 | Gagner ................ G07F 17/323 463/25 |
| 2011/0193867 A1* | 8/2011 | Ahn et al. ...................... 345/474 |
| 2012/0036046 A1* | 2/2012 | Anderson et al. ........... 705/27.1 |

(Continued)

FOREIGN PATENT DOCUMENTS

| JP | 11-144024 | 5/1999 |
| JP | 2003-281297 | 10/2003 |
| JP | 2006-227838 | 8/2006 |

(Continued)

OTHER PUBLICATIONS

Oct. 18, 2016, JP communication issued for related JP application No. 2013-081081.

(Continued)

*Primary Examiner* — Tapas Mazumder
(74) *Attorney, Agent, or Firm* — Paratus Law Group, PLLC

(57) ABSTRACT

There is provided an image processor including a recognition part configured to recognize a captured target on the basis of a captured image, and an image generation part configured to generate an additive image for decorating the target depending on a user circumstance of a user seeing the target and a recognition result by the recognition part.

21 Claims, 13 Drawing Sheets

(56) References Cited

U.S. PATENT DOCUMENTS

2013/0009993 A1* 1/2013 Horseman .......... G06F 19/3418
  345/633
2013/0058542 A1* 3/2013 Stubler et al. ................ 382/118

FOREIGN PATENT DOCUMENTS

| JP | 2007-133599 | 5/2007 |
| JP | 2009-211362 | 9/2009 |
| JP | 2011-186007 | 9/2011 |

OTHER PUBLICATIONS

Miyawaki Kenzaburou, et al., Eating (Media Processing for Daily Life: the Science of Cooking Activities), The Institute of Electronics, Information and Communication Engineers (IEICE), pp. 48-54. vol. 93, No. 1, 2010, Japan. n.

* cited by examiner

FIG.6
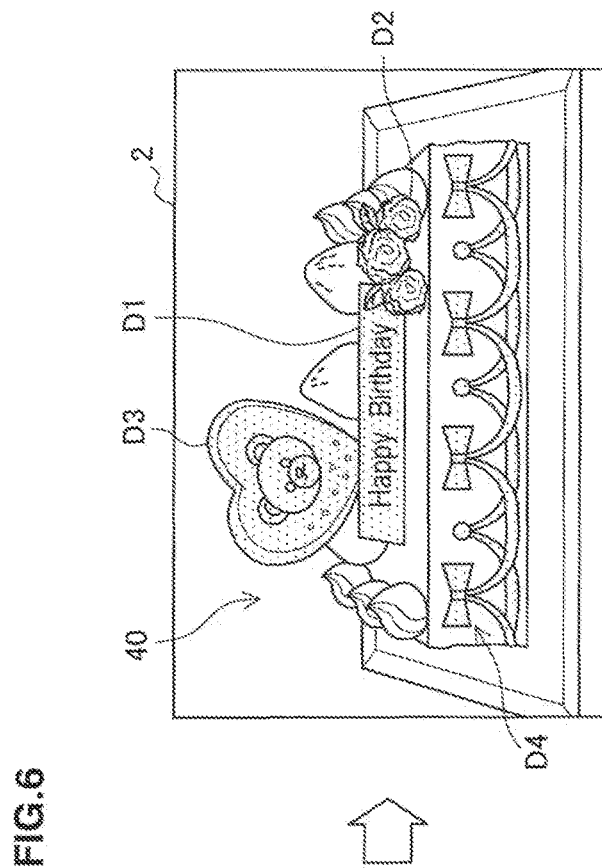
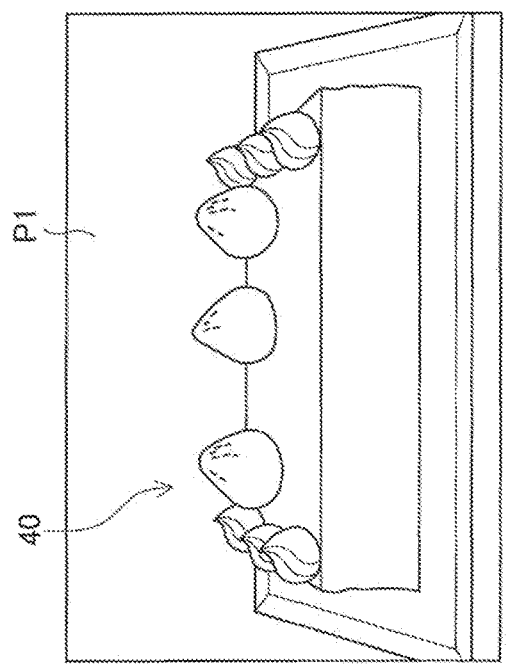

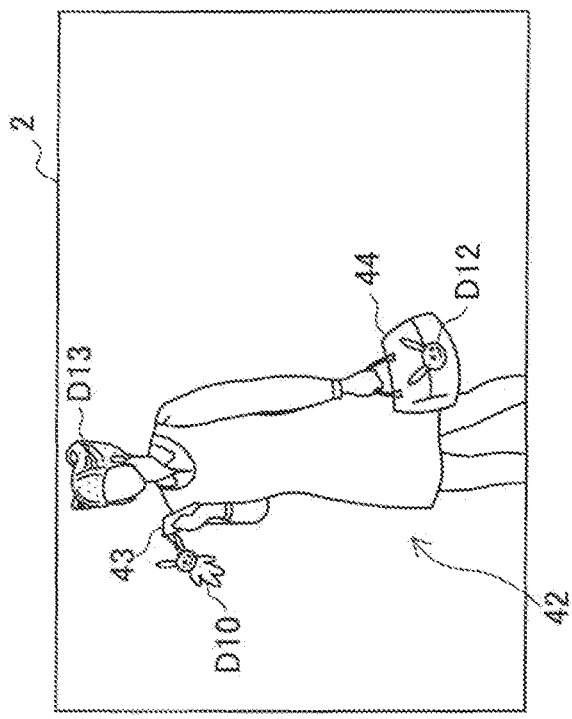
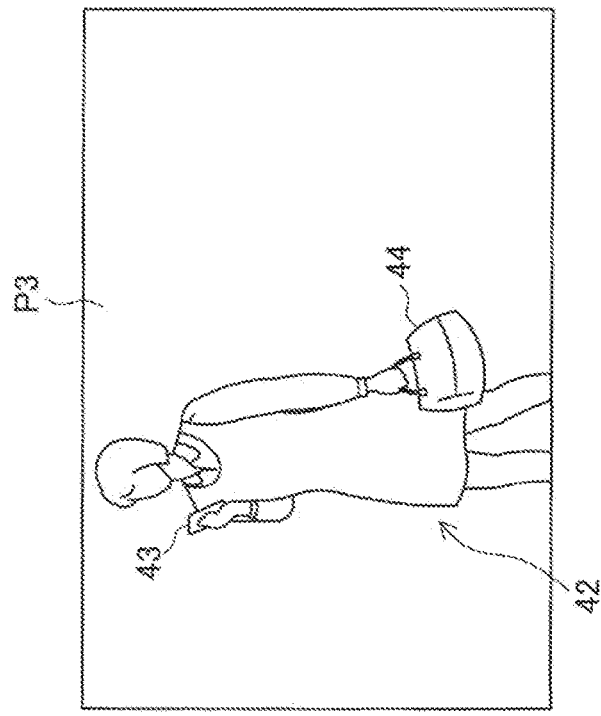
FIG. 12

IMAGE PROCESSOR AND STORAGE MEDIUM

CROSS REFERENCE TO RELATED APPLICATIONS

This application claims the benefit of Japanese Priority Patent Application JP 2013-081081 filed Apr. 9, 2013, the entire contents of which are incorporated herein by reference.

BACKGROUND

The present disclosure relates to an image processor and a storage medium.

The following technologies have been disclosed concerning a technology for synthesizing captured images obtained by capturing an object (real object) existing in a real space a virtual object.

For example, JP H11-144024A discloses a technology in which an image composition device is equipped with an image synthesis part for synthesizing a video of a camera and an additive image, generates an appropriate additive image depending on a feature amount of instructed position by a pen or the like, instructed area and instruction information, and synthesizes and displays the images on a display unit.

JP 2009-211362A discloses an image processor which synthesizes images on the basis of information of a base image and information of an accessory image superimposed on the base image to present a proper simulation image.

JP 2009-211362A discloses a photographic seal creation apparatus located in a game arcade or the like. Specifically, when a user taps a stylus pen on an edited image displayed on an edited image display unit, a decoration image displayed on the edited image display unit is synthesized on the edited image at a designated position as a synthesized stamp image and on an edge of a person's image in the edited image.

SUMMARY

However, no patent document above refers to superimposition on the target of the additive image (decoration image) depending on a user circumstance such as user's biological information, emotion information, preference information and the like.

The present disclosure proposes new and improved image processor and storage medium which are capable of automatically generating an additive image for virtually decorating a capture target with the user circumstance being reflected.

According to an embodiment of the present disclosure, there is provided an image processor including a recognition part configured to recognize a captured target on the basis of a captured image, and an image generation part configured to generate an additive image for decorating the target depending on a user circumstance of a user seeing the target and a recognition result by the recognition part.

According to an embodiment of the present disclosure, there is provided a non-transitory computer-readable storage medium having a program stored therein, the program causing a computer to function as: a recognition part configured to recognize a captured target on the basis of a captured image, and an image generation part configured to generate an additive image for decorating the target depending on a user circumstance of a user seeing the target and a recognition result by the recognition part.

As described above, according to the present disclosure, the additive image for virtually decorating the capture target can be automatically created with the user circumstance being reflected.

BRIEF DESCRIPTION OF THE DRAWINGS

FIG. 6 is a diagram for explaining a first decoration according to an embodiment;

FIG. 12 is a diagram for explaining a decoration depending on a target circumstance according to another embodiment.

DETAILED DESCRIPTION OF THE EMBODIMENT(S)

Figure 1:
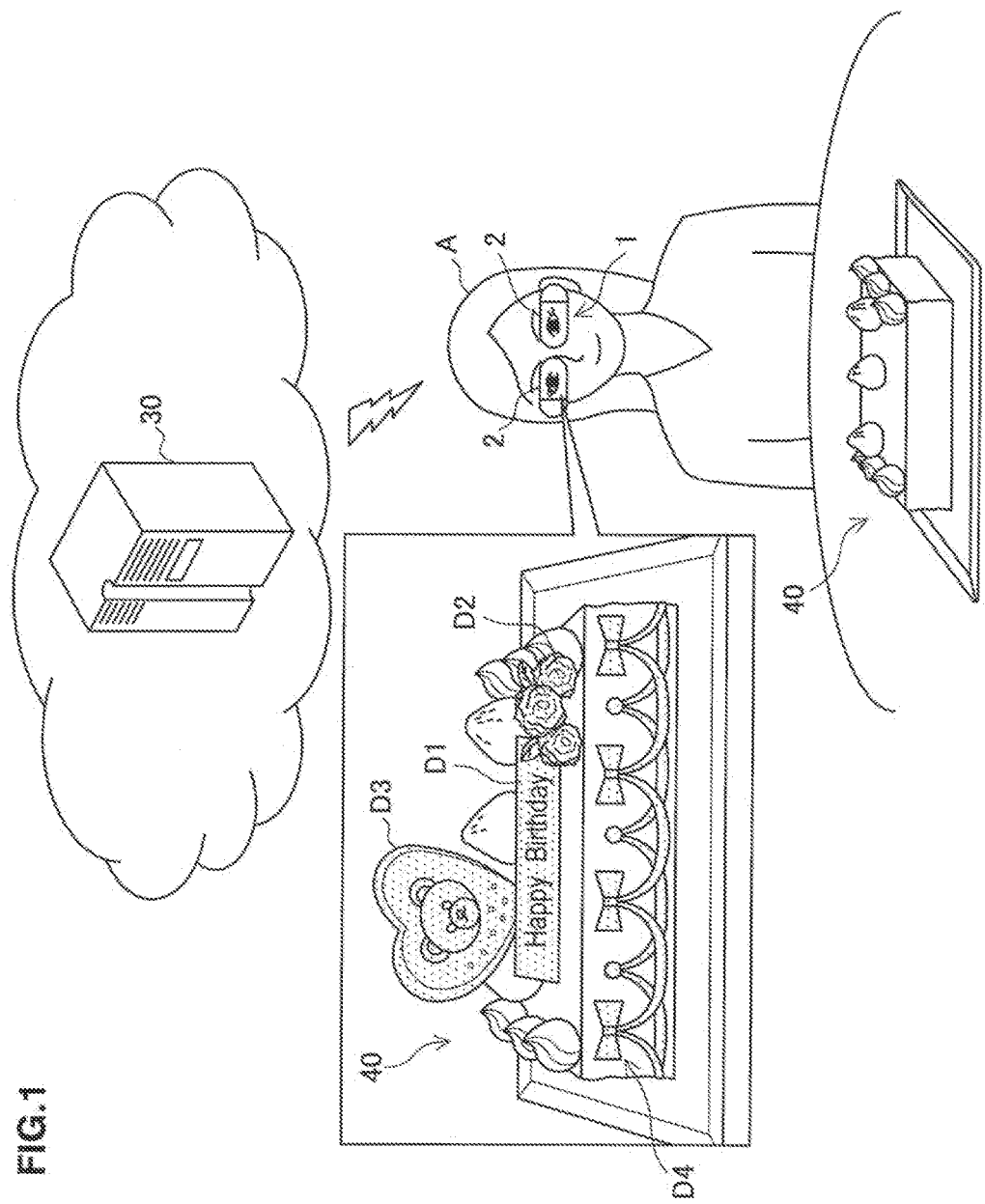
FIG. 1 is a diagram for explaining an outline of a decoration system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The explanation will be given in the following order.

1. Outline of decoration system according to an embodiment of the present disclosure
2. Basic configuration
2-1. Basic configuration of HMD
2-1-1. External configuration example of HMD
2-1-2. Internal configuration example of HMD
2-2. Basic configuration of server
3. Operation processing
3-1. First decoration processing
3-2. Second decoration processing
3-3. Third decoration processing
4. Another embodiment
5. Conclusion

1. OUTLINE OF DECORATION SYSTEM ACCORDING TO AN EMBODIMENT OF THE PRESENT DISCLOSURE

First, a description will be given of an outline of a decoration system according to an embodiment of the present disclosure with reference to FIG. 1.

FIG. 1 is a diagram for explaining the outline of the decoration system according to an embodiment of the present disclosure. As illustrated in FIG. 1, a user A wears a HMD (Head Mounted Display) 1 of an eyeglasses type. The HMD 1 has a worn unit of a frame configuration of, for example, a semi-round from both temporal regions to an occipital region, and is put on both auditory capsules to be worn by the user A. The HMD 1 is configured such that, in the worn state, a pair of display units 2 for the left eye and the right eye are placed immediately in front of either eye of the user A, or in other words at the locations where the lenses of ordinary eyeglasses are positioned. The display unit 2 may be a transparent type, and the display unit 2 is set in a see-through state, that is, a transparent or translucent state by the HMD 1 to allow the user A to normally live with no trouble even if the HMD 1 is regularly worn like eyeglasses. A specific external configuration of the HMD 1 will be described later with reference to FIG. 2.

The HMD 1 is connected to a server 30 on a network by way of a wireless communication to receive and transmit data. The decoration system according to an embodiment of the present disclosure includes the HMD 1 and the server 30 as illustrated in FIG. 1.

BACKGROUND

Recently, as disclosed in JP 2009-211362A above, carried out on a daily basis are printing various decorations with being superimposed on a user's figure, and sticking decoration seals and beads, and seals and beads for representing user's identity on a mobile phone terminal or smartphone, and bag. Further, also carried out on a daily basis is attaching favorite dangle-dolly and plushie on the mobile phone terminal or smartphone and bag besides sticking the decoration seals and beads.

However, since an accessory such as decoration seals, beads and plushie is a real object, when the user wants changing into another accessory, he/she has taken a trouble of removing the accessory used at this time and attaching a new accessory. Moreover, a trouble of finding and purchasing a new accessory is also taken, which has made difficult to change casually and adequately such as on a daily, hourly, or weekly basis and the like.

As the decoration made on a daily basis, in addition to the above decoration on belongings such as the mobile phone terminal or smartphone, the decoration is made on foods such as a cake. Especially, the cake for a birthday, Christmas or the like is decorated with various garnishes and toppings for the purpose of a deluxe or gorgeous appearance. However, the garnish may often not be edible and have to be removed as eating progresses or have to be detached in cutting, making it difficult to enjoy seeing the decoration while eating proceeds. Additionally, a ceremony is performed on a birthday in which candles are put on the cake and lighted, and blown out by a principal role. The candles, however, are removed when the cake is actually eaten, which makes holes in the cake, looking horrible or leading to distastefulness of guttering candle.

In a case where the accessory is not the real object, but a virtual object (accessory image), it is conceivable that the accessory image is synthesized on the captured image of the belongings and foods above for virtual decoration. However, typically, the accessory image is considered to be set in advance or arbitrarily selected by the user.

Then, a decoration system has been produced according to the embodiments of the present disclosure focusing on the above conditions. The decoration system according to the embodiments of the present disclosure automatically generates an additive image as a virtual accessory to decorate a capture target with a user circumstance being reflected, and controls and displays the generated additive image to be superimposed on the target.

This allows the decoration system according to the present disclosure to automatically generate the additive image for decoration depending on a user circumstance such as user's favorite, health condition, feeling, behavior and the like and display the generated image to be superimposed on the target, improving convenience. In particular, reflection of the user circumstance like this in real time upon the additive image can omit detaching or purchasing of the accessory to achieve virtual decoration more meeting needs of the user.

Specifically, as illustrated in FIG. 1, the HMD 1 captures a target 40 as a photographic subject by way of an image capture lens (image capture lens 3*a* shown in FIG. 2) which is placed facing forward so as to capture a direction in which the user sees as a photographic direction while in a state of being worn by the user A, and transmits the captured image to the server 30.

Next, the server 30 (image processor) recognizes the target 40 (cake) from the captured image transmitted from the HMD 1, generates the additive image (e.g., additive images D1 to D4) for decorating the target 40, and transmits the generated additive images D1 to D4 to the HMD 1 (image display terminal).

Here, the server 30 generates the additive images D1 to D4 depending on the user circumstance of the user A. In this description, the user circumstance indicates, for example, the user A biological information, emotion information, preference information, behavior circumstance (including a behavior plan), or environmental information.

The biological information includes the user A sex, age, date of birth, blood group, pulse, heart rate, brain wave, bodily temperature, amount of sweating or the like, and is registered by the user A in advance or actually measured by the HMD 1 in real time.

The emotion information is information indicating a present emotion of the user A (mind, feeling), and is determined from, for example, the user pulse, heart rate, brain wave, bodily temperature, amount of sweating which are actually measured by the HMD 1, or from an expression of the user A on the basis of a captured image obtained by capturing a face of the user A.

The preference information is information indicating various favorites of the user A, and is registered by the user A in advance as well as determined from the user A merchandise purchase history, eating and drinking history, behavior history and the like on the basis of analysis result of various life logs of the user A. The life log includes a posted item or blog item by the user A in SNS (Social Networking Service) used by the user A.

The behavior circumstance is information indicating a present behavior or behavior plan of the user A, and the present behavior is determined on the basis of, for example, a detection result actually measured in real time by use of a gyro sensor, acceleration sensor, geomagnetic sensor, location positioning unit, imaging capture sensor and the like which are provided to the HMD 1. The behavior plan is determined on the basis of schedule information and the like of the user A.

The environmental information is information indicating an environment where the user A is presently located, and is present location information measured by a GPS (Global Positioning System) provided to the HMD 1, date information, time information, weather information and the like, for example.

The various pieces of information indicating the user circumstance as described above may stored in the server 30 in advance or transmitted from the HMD 1 to the server 30. The server 30, as described above, generates the additive images D1 to D4 depending on the user circumstance of the user A.

In the example shown in FIG. 1, the server 30 generates the additive images D2 to D4 for decorating the target 40 (cake) with user A favorite character and color or favorite thing (e.g., flower, ribbon) on the basis of the preference information of the user A, for example. The server 30, if the present date is a birthday of the user A on the basis of the biological information of the user A, generates the additive image D1 for decorating the target 40 (cake) with a message celebrating the birthday.

Then, the HMD 1, when receiving the additive images D1 to D4 generated by the server 30, displays the additive images D1 to D4 so as to be superimposed on the target 40 on the display unit 2 as illustrated in FIG. 1. The HMD 1 may control the display unit 2 to be in the see-through state (transparent or translucent) and display the additive images D1 to D4 on the display unit 2 so as to be superimposed on the target 40 which exist in a real space, or may synthesize the additive images D1 to D4 on a captured image obtained by capturing the target 40 and display the synthesized image on the display unit 2 which is controlled to be non-transparent. This allows the HMD 1 to virtually decorate the target 40 (cake) depending on the user circumstance of the user A.

The additive images D1 to D4 are varied at any time by the HMD 1 or the server 30 depending on changes of a target 40 circumstance, which may provide the user with a feeling as if the decoration is really made. For example, as illustrated in FIG. 1, in a case where the target 40 is a food such as a cake, when eating the cake by the user A progresses, the HMD 1 or the server 30, depending on the progress of the eating and drinking, moves display positions of or removes the additive images D1 to D4 for garnishes and toppings. This makes the user A enjoy seeing the decoration on the foods while eating and drinking.

The above thus describes the outline of the decoration system according to an embodiment of the present disclosure. Subsequently, a description will be given of a basic configuration of the HMD 1 and server 30 included in the decoration system according to the embodiment.

2. BASIC CONFIGURATION

<2-1. Basic Configuration of HMD>

(2-1-1. External Configuration Example of HMD)

Figure 2:
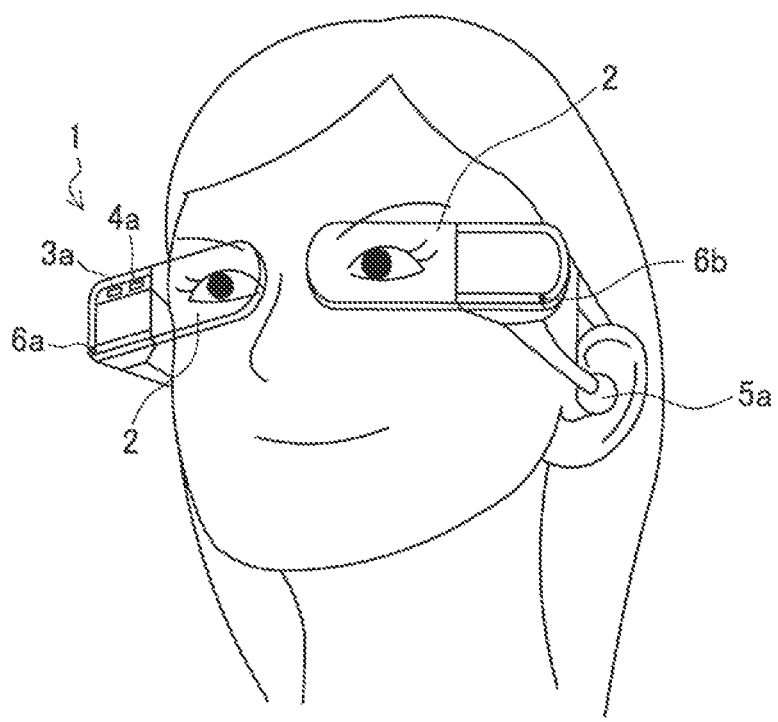
FIG. 2 is a diagram illustrating an exemplary external configuration of an HMD according to an embodiment.

First, with reference to FIG. 2, an external configuration of the HMD 1 will be specifically described. FIG. 2 is a diagram illustrating the external configuration of the HMD 1 according to the embodiment.

As illustrated in FIG. 2, the HMD 1 is configured such that, in the worn state, a pair of display units 2 for the left eye and the right eye are placed immediately in front of either eye of the user A, or in other words at the locations where the lenses of ordinary eyeglasses are positioned.

Also, in the HMD 1, the image capture lens 3a is placed facing forward, so as to capture the direction in which the user sees as the photographic direction while in a state of being worn by the user A. Furthermore, a light emitter 4a that provides illumination is provided in the image capture direction by the image capture lens 3a. The light emitter 4a is formed by a light-emitting diode (LED), for example.

Also, although only illustrated on the left eye side in FIG. 2, a pair of earphone speakers 5a which may be inserted into a user's right ear canal and left ear canal in the worn state are provided. Also, microphones 6a and 6b that pick up external sounds are placed to the right of the display unit 2 for the right eye, and to the left of the display unit 2 for the left eye.

Note that the external appearance of the HMD 1 illustrated in FIG. 2 is an example, and that a variety of structures by which a user may wear the HMD 1 are conceivable. It is sufficient for the HMD 1 to be formed as a worn unit of the eyeglasses type or head-mounted type, and at least for the present embodiment, it is sufficient for a display unit 2 to be provided close in front of a user's eye. Also, besides the display units 2 being provided as a pair corresponding to either eye, a configuration providing a single display unit 2 corresponding to an eye on one side is also acceptable.

Also, although the image capture lens 3a and the light emitter 4a that provides illumination are placed facing forward on the side of the right eye in the example illustrated in FIG. 1, the image capture lens 3a and the light emitter 4a may also be placed on the side of the left eye, or placed on both sides.

It is also acceptable to provide a single earphone speaker 5a to be worn in only one ear, rather than as left and right stereo speakers. Likewise, a microphone may be one of either the microphone 6a or 6b.

Furthermore, a configuration not equipped with the microphones 6a and 6b or the earphone speakers 5a is also conceivable. A configuration not provided with the light emitter 4a is also conceivable.

The above thus describes the external configuration of the HMD 1 illustrated in FIG. 2. In this description, the HMD 1 is used as an example of the image display terminal the user has, but the image display terminal according to the present disclosure is not limited to the HMD 1. For example, the image display terminal may be a smartphone, mobile phone terminal, PDA (Personal Digital Assistants), PC (Personal Computer), tablet terminal and the like.

(2-1-2. Internal Configuration Example of HMD)

Figure 3:
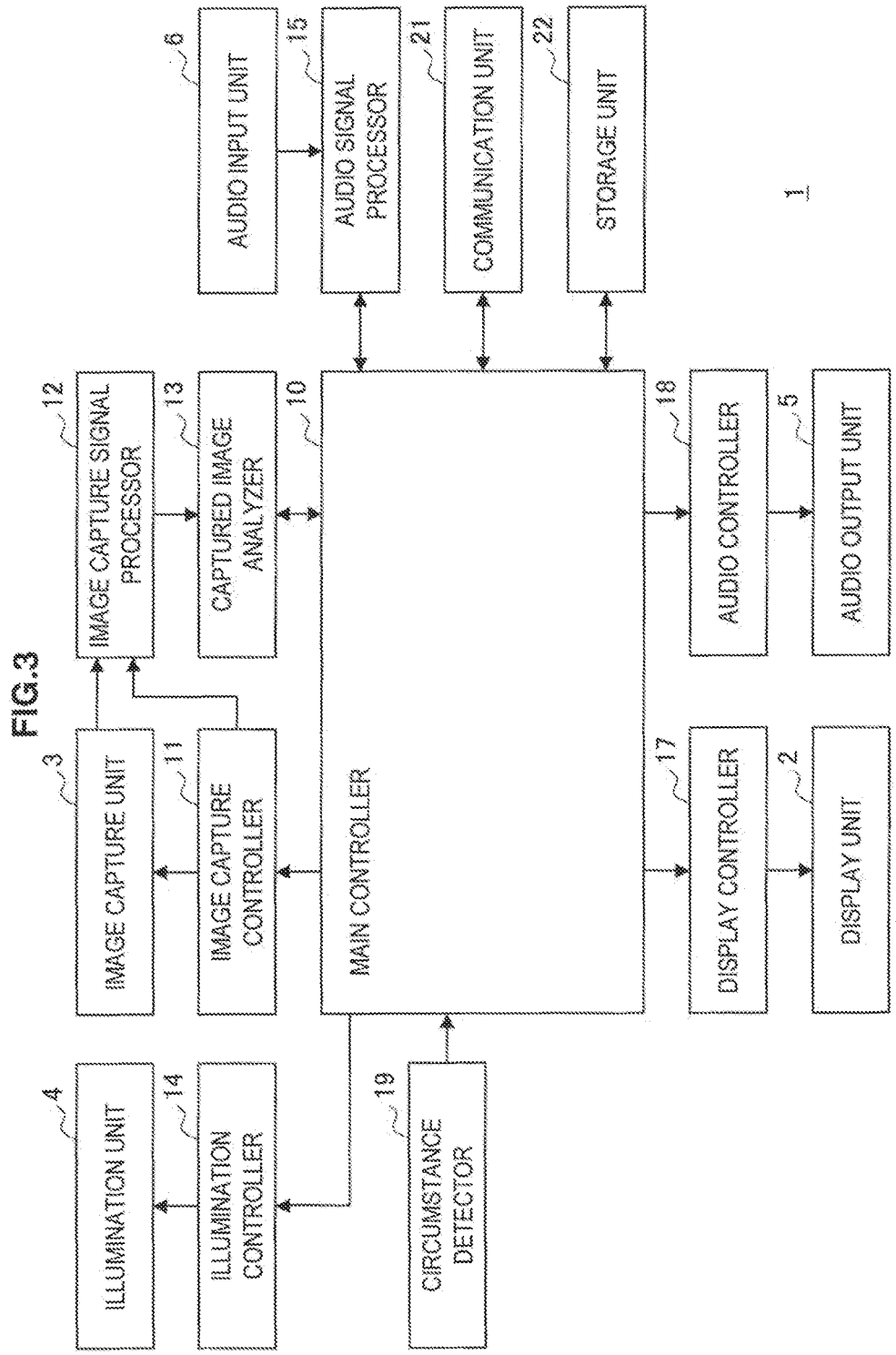
FIG. 3 is a block diagram illustrating an exemplary internal configuration of the HMD according to an embodiment.

Subsequently, with reference to FIG. 3, a description will be specifically given of an internal configuration of the HMD 1. FIG. 3 a block diagram illustrating an exemplary internal configuration of the HMD 1 according to the embodiment. As illustrated in FIG. 3, the HMD 1 according to the embodiment includes the display unit 2, image capture unit 3, illumination unit 4, audio output unit 5, audio input unit 6, main controller 10, image capture controller 11, image capture signal processor 12, captured image analyzer 13, illumination controller 14, audio signal processor 15, display controller 17, audio controller 18, circumstance detector 19, communication unit 21, and storage unit 22.

(Main Controller 10)

The main controller 10 is made up of a microcontroller equipped with a central processing unit (CPU), read-only memory (ROM), random access memory (RAM), non-volatile memory, and an interface unit, for example, and controls the respective components of the HMD 1.

The main controller 10 controls such that the image capture unit 3 captures the target, and the captured image is processed by the image capture signal processor 12 and the captured image analyzer 13 and is transmitted via the communication unit 21 to the server 30. Moreover, the main controller 10 controls such that various detection results detected by the circumstance detector 19 are transmitted together with the captured image via the communication unit 21 to server 30.

The main controller 10 supplies the additive image received from the server 30 by the communication unit 21 to the display controller 17 and displays the additive image on the display unit 2 to be superimposed on the target.

(Image Capture Unit)

The image capture unit 3 (image capture sensor) includes a lens subsystem made up of the image capture lens 3a, a diaphragm, a zoom lens, a focus lens, and the like, as illustrated in FIG. 2, a driving subsystem that causes the lens subsystem to conduct focus operations and zoom operations, a solid-state image sensor array that generates an image capture signal by photoelectric conversion of captured light obtained with the lens subsystem, and the like. The solid-state image sensor array may be realized by a charge-coupled device (CCD) sensor array or a complementary metal-oxide-semiconductor (CMOS) sensor array, for example.

The image capture unit 3 according to the embodiment captures the target to be virtually decorated and outputs the captured image to the image capture signal processor 12.

(Image Capture Controller)

The image capture controller 11 controls operations of the image capture unit 3 and the image capture signal processor 12 on the basis of instructions from the main controller 10. For example, the image capture controller 11 controls the switching on/off of the operations of the image capture unit 3 and the image capture signal processor 12. The image capture controller 11 is also configured to apply control (motor control) causing the image capture unit 3 to execute operations such as autofocus, automatic exposure adjustment, diaphragm adjustment, and zooming. The image capture controller 11 is also equipped with a timing generator, and controls signal processing operations with timing signals generated by the timing generator for the solid-state image sensors as well as the sample and hold/AGC circuit and video A/D converter of the image capture signal processor 12. In addition, this timing control enables variable control of the image capture frame rate.

Furthermore, the image capture controller 11 controls image capture sensitivity and signal processing in the solid-state image sensors and the image capture signal processor 12. For example, as image capture sensitivity control, the image capture controller 11 is able to conduct gain control of signals read out from the solid-state image sensors, set the black level, control various coefficients for image capture signal processing at the digital data stage, control the correction magnitude in a shake correction process, and the like.

(Image Capture Signal Processor)

The image capture signal processor 12 is equipped with a sample and hold/automatic gain control (AGC) circuit that applies gain control and waveform shaping to signals obtained by the solid-state image sensors of the image capture unit 3, and a video analog/digital (A/D) converter. Thus, the image capture signal processor 12 obtains an image capture signal as digital data. The image capture signal processor 12 also conducts white balance processing, luminance processing, chrome signal processing, shake correction processing, and the like on an image capture signal.

(Captured Image Analyzer)

The captured image analyzer 13 is an example of a configuration for detecting external circumstances. Specifically, the captured image analyzer 13 analyzes image data (a captured image) that has been captured by the image capture unit 3 and processed by the image capture signal processor 12, and obtains information on an image included in the image data.

Specifically, for example, the captured image analyzer 13 conducts analysis such as point detection, line and contour detection, and region division on the image data (captured image) to output an analysis result to the main controller 10. The analysis result for the captured image may be transmitted together with the captured image to the server 30. Outputting to the main controller 10 the analysis result for the captured image which is continuously captured allows the main controller 10 to recognize a gesture input by the user.

(Illumination Unit, Illumination Controller)

The illumination unit 4 includes the light emitter 4a illustrated in FIG. 2 and a light emission circuit that causes the light emitter 4a (an LED, for example) to emit light. The illumination controller 14 causes the illumination unit 4 to execute light-emitting operations, according to control by the main controller 10. By attaching the light emitter 4a in the illumination unit 4 as a unit that provides illumination in front as illustrated in FIG. 2, the illumination unit 4 conducts illumination operations in the direction of a user's line of sight.

(Audio Input Unit, Audio Signal Processor)

The audio input unit 6 includes the microphones 6a and 6b illustrated in FIG. 2, as well as a mic amp unit and A/D converter that amplifies and processes an audio signal obtained by the microphones 6a and 6b, and outputs audio data to the audio signal processor 15. The audio signal processor 15 conducts processing such as noise removal and source separation on audio data obtained by the audio input unit 6. Processed audio data is then supplied to the main controller 10. Equipping an HMD 1 according to the present embodiment with the audio input unit 6 and the audio signal processor 15 enables voice input from the user, for example.

(Circumstance Detector)

The circumstance detector 19 is an example of a configuration for detecting the external circumstance. Specifically, the circumstance detector 19 includes a gyro sensor, acceleration sensor, geomagnetic sensor, location positioning unit (e.g., GPS unit), biological sensor or the like. The circumstance detector 19 outputs a detection result to the main controller 10. The biological sensor includes various biological sensors capable of detecting a pulse, heart rate, brain wave, bodily temperature, amount of sweating or the like of the user A wearing the HMD 1.

(Display Controller)

The display controller 17 functions as an image processing part processing a predetermined image data to be displayed on the display unit 2 according to control from the main controller 10. Specifically, the display controller 17 includes a video processor, digital signal processor, a D/A converter and the like, for example, and conducts generation of display image data, luminance level adjustment of the generated display image data, color correction, contrast adjustment, sharpness (contour enhancement) adjustment and the like.

The display controller 17 also functions as a driving control part for displaying a predetermined image data on the display unit 2 according to control from the main controller 10. Specifically, the display controller 17 includes a pixel driving circuit for displaying the image data on the display unit 2 configured as a liquid crystal display, for example. The display controller 17 (driving control part) also can control transmittances of pixels in the display unit 2 to set the display unit 2 in the see-through state (transparent or translucent state), or a non see-through state.

The display controller 17 (image processing part) according to the embodiment adjusts the additive image for virtually decorating the target so as to be displayed at a position corresponding to the target existing in the real space, or at a predetermined position on the captured image obtained by capturing the target according to control from the main controller 10. Specifically, the display controller 17 (image processing part) sequentially displays the captured images obtained by continuously capturing the target on the display unit 2 and controls such that the additive image is displayed to be superimposed on a proper position corresponding to the target image in the relevant captured image. In other words, the display controller 17 (image processing part) controls such that the synthesized image having the additive image superimposed on the captured image is displayed on the display unit 2.

Alternatively, the display controller 17 (image processing part) controls the display unit 2 to be in the see-through state, and controls such that the additive image is displayed at a proper position corresponding to the target existing in the real space when the user A sees the target via the display unit 2 which is in the see-through state in the state where the HMD 1 is worn by the user A. In this case, the display controller 17 (image processing part) can control such that the additive image is displayed at a proper position corresponding to the target as the real object on the basis of the analysis result (result of detecting a feature point, line, contour, region and the like of the target) for the captured image obtained by capturing the target according to control from the main controller 10.

(Display Unit)

As illustrated in FIG. 1 and FIG. 2, the display unit 2 is made up of, in the worn state, a pair of display unit 2 for the left eye and the right eye are placed immediately in front of either eye of the user A, or in other words at the locations where the lenses of ordinary eyeglasses are positioned. The display unit 2 displays in real time the captured image of the target captured by the image capture unit 3 or displays the additive image for virtually decorating the target according to control from the display controller 17. The display unit 2 may be controlled to be set in the see-through state (transparent or translucent) or non see-through state (non-transparent) by the display controller 17.

(Audio Controller)

The audio controller 18 conducts generation of audio signal data, volume adjustment of the generated audio signal data, audio quality adjustment, acoustic effect and the like according to control from the main controller 10. The audio controller 18 controls such that a predetermined audio signal data is output from the audio output unit 5 according to control from the main controller 10.

(Audio Output Unit)

The audio output unit 5 includes the pair of earphone speakers 5*a* illustrated in FIG. 2, and an amp circuit for the earphone speakers 5*a*. Also, the audio output unit 5 made be configured as what is called a bone conduction speaker. The audio output unit 5, according to control from the audio controller 18, outputs (plays back) audio signal data.

(Storage Unit)

The storage unit 22 is a member that records or plays back data with respect to a designated recording medium. The storage unit 22 is realized by a hard disk drive (HDD), for example. Obviously, various media such as flash memory or other solid-state memory, a memory card housing solid-state memory, an optical disc, a magneto-optical disc, and holographic memory are conceivable as the recording medium, and it is sufficient to configure the storage unit 22 to be able to execute recording and playback in accordance with the implemented recording medium.

The storage unit 22 according to the embodiment can store the captured images continuously captured by the image capture unit 3 and the audio signal data continuously picked up by the audio input unit 6 as the life log while the HMD 1 is being worn by the user A. The storage unit 22 can store the detection result continuously detected by the biological sensor and location positioning unit (either one is an example of the circumstance detector 19) as the life log while the HMD 1 is being worn by the user A. The storage unit 22 may have stored therein the preference information and biological information (sex, age, date of birth and the like) of the user A which are registered by the user A in advance.

(Communication Unit)

The communication unit 21 sends and receives data to and from external equipment. The communication unit 21 communicates wirelessly with external equipment directly or via a network access point, according to a scheme such as a wireless local area network (LAN), Wi-Fi (Wireless Fidelity, registered trademark), infrared communication, or Bluetooth (registered trademark).

For example, the communication unit 21 communicates wirelessly with the server 30 illustrated in FIG. 1.

The above thus describes in detail an internal configuration of an HMD 1 according to the present embodiment. Note that although the audio output unit 5, audio input unit 6, audio signal processor 15, and audio controller 18 are illustrated as an audio-related configuration, it is not strictly necessary to provide all of the above.

With the above configuration, the HMD 1 according to the embodiment can display the additive image for decoration depending on the user circumstance on the display unit 2 at a proper position corresponding to the target as the real object or a target image obtained by capturing the target as the real object to virtually decorate the target depending on the user circumstance. For example, the HMD 1 can virtually make decoration the user A likes depending on the preference of the user A.

<2-2. Basic Configuration of Server>

Figure 4:
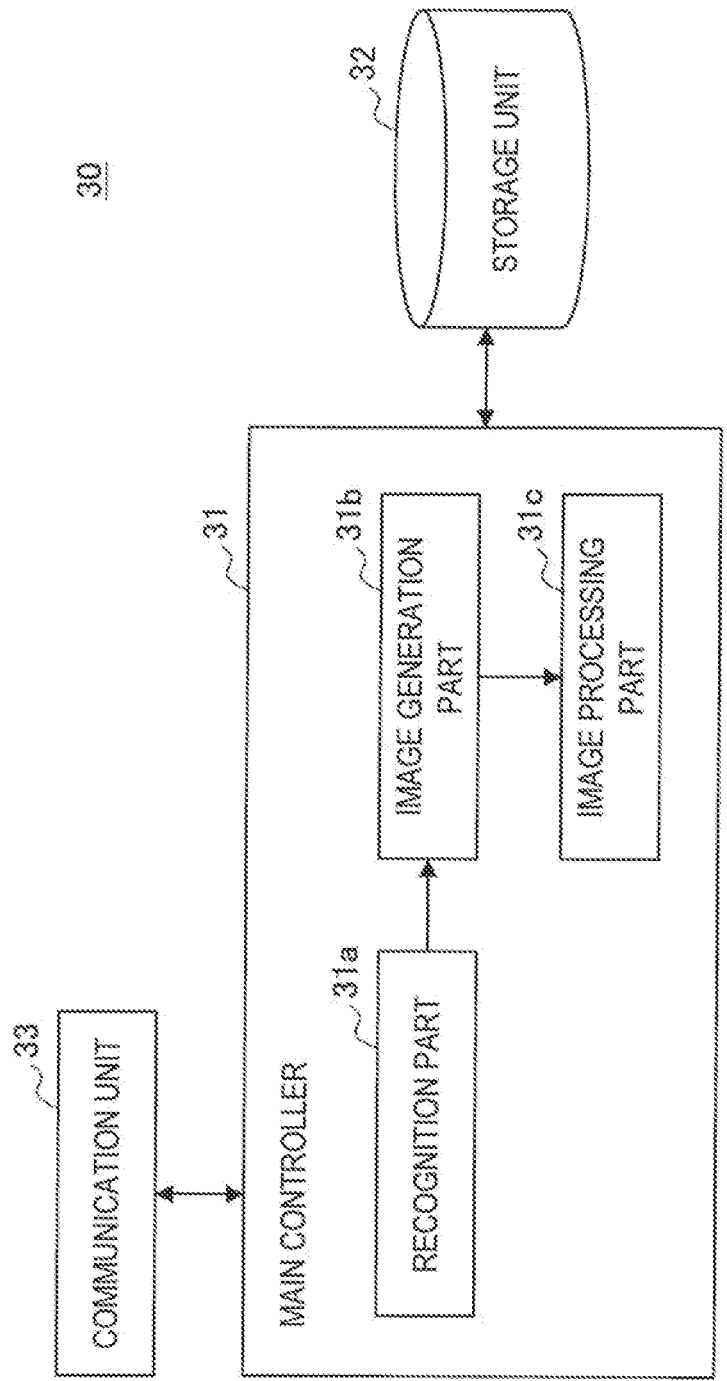
FIG. 4 is a block diagram illustrating an exemplary internal configuration of a server according to an embodiment.

Next, a description will be given of a configuration of the server 30 included in the decoration system according to the embodiment with reference to FIG. 4. FIG. 4 is a block diagram illustrating an exemplary internal configuration of the server 30 according to the embodiment.

As illustrated in FIG. 4, the server 30 includes a main controller 31, storing unit 32, and communication unit 33.

(Main Controller)

The main controller 31 is made up of a microcontroller equipped with a CPU, ROM. RAM, non-volatile memory, and an interface unit, for example, and controls the respective components of the server 30.

The main controller 31 according to the embodiment functions as a recognition part 31*a*, image generation part 31*b*, and image processing part 31*c* as illustrated in FIG. 4. The recognition part 31*a* recognizes a captured target on the basis of the captured image transmitted via the communication unit 33 from the HMD 1. Specifically, recognition part 31*a* conducts analysis such as point detection, line and contour detection, and region division on the captured image to extract feature amount data or local feature amount data of the target such as a shape and size. Then, the recognition part 31*a* compares the feature amount data or local feature amount data of the respective real objects registered in a model database which is stored in the storing unit 32 with the feature amount or local feature amount data extracted from the captured image, either one of which having higher similarity than a predetermined value is set to a recognition result. This allows the recognition part 31*a* to recognize what the target included in the captured image is.

The recognition part 31*a* supplied the recognition result to the image generation part 31*b*. The recognition part 31*a* may make the recognition result which is to be supplied to the image generation part 31*b* have information indicating what the target appearing in the captured image is and the feature amount data or local feature amount data as the analysis result for the captured image.

The image generation part 31*b* generates the additive image for decorating the target depending on a circumstance of the user seeing the target (user circumstance) and recognition result from the recognition part 31*a*. Here, the "user seeing the target" is a wearer of the HMD 1 which transmits the captured image obtained by capturing the target to the server 30, that is, the user A who is wearing the HMD 1 and seeing the target 40 in the example illustrated in FIG. 1. The user circumstance indicates, for example, the user A biological information, emotion information, preference information, behavior circumstance, or environmental information as described above, and is acquired from the storing unit 32 in the server 30, over the network, from the HMD 1 or the like. Then, the image generation part 31*b* generates the additive image for virtually decorating the recognized target depending on the user circumstance. The additive image to be generated may be generated by combining or deforming material images stored in the storing unit 32, or using free materials acquired over the network. The server 30, in generating the additive image, can also charge the user A (HMD 1) to increase variation of the additive images generated by the image generation part 31*b* depending on a charged amount (payment of the user A).

For example, if the recognition part 31*a* recognizes that the target is food and drink, the image generation part 31*b* generates additive image for decorating food and drink. Specifically, if the target is recognized as a cake as illustrated in FIG. 1, the image generation part 31*b* generates the additive image for decorating a top surface or side surface of the cake. At this time, the image generation part 31*b* generates, as the additive image for decorating the cake depending on the user circumstance, for example, the additive image matching the user A favorite (favorite character, color, thing, or the like) on the basis or the preference information. Further, the image generation part 31*b* may additionally generate the additive image for an event such as Valentine, White Day, Christmas, or Doll Festival depending on the date. The image generation part 31*b* may generates the additive image of a massage for celebrating the birthday or anniversary depending on the birthday of the user A on the basis of the biological information or a specified anniversary of the user A included in the preference information (which may be automatically determined from the analysis result or the like for a posted item or blog item in SNS). If a plurality of cakes (targets) are recognized from the captured image, the image generation part 31*b* determines that the cake (target) at a location the nearest the user A is the cake for the user A, and may decorate only the cake for the user A.

Further, the image generation part 31*b* may decorate only the cake of the user A so as to look larger than other cakes.

The image generation part 31*b*, also in case where the target is a mobile terminal such as a mobile phone terminal, smartphone, PDA, portable music player and digital camera, or various objects such as a bag, cup, penholder, vase, vehicle, and power pole, generates the additive images for decorating the respective objects. Specifically, if the target is recognized as a smartphone, the image generation part 31*b* generates as the additive image a seal image for decorating each surface of the smartphone or a strap image looking being attached to the smartphone. At this time, the image generation part 31*b* generates, for example, the seal image or strap image matching the user A favorite (favorite character, color, thing, or the like) on the basis of the preference information as the additive image for decorating the smartphone depending on the user circumstance. The image generation part 31*b* may generate the additive image for decorating a plurality of belongings of the user A with a user A favorite color. For example, in a case where a smartphone, music player, and bag carried by the user A are recognized from the captured image, the belongings of the user A can be uniformed in color by generating the additive image for decorating all with the same color.

Further, the image generation part 31*b* generates the additive image for decorating the smartphone depending on the biological information of the user A (the health condition and the like of the user A determined from the pulse, bodily temperature, amount of sweating and the like) or the emotion information (the feeling and the like of the user A determined from the pulse, heart rate, brain wave and the like). For example, when the user A has a fever with the bodily temperature being higher than a predetermined temperature (in a bad health condition) or the feeling is low, the image generation part 31*b* generates the additive image for decoration having a relaxation effect and calming effect with colors, or for decorating with a soft color (warm color, faint color, or light color). On the other hand, when the feeling of the user A is high and the like, the image generation part 31*b* generates the additive image for more gorgeous decoration having effect of further lifting the feeling (garish decoration, high color, lame color including gold and silver, or the like).

The image generation part 31*b* can also generate the additive image for decorating the smartphone depending on the environmental information of the user A. The environmental information is information indicating an environment where the user A is presently located, and is information, for example, on weather (rain, shine, cloud, snow typhoon or the like), time (time zone such as morning, afternoon, and night), location (mountain, sea, town, theme park and the like) and the like. Specifically, the image generation part 31*b* generates the additive image of an umbrella, frog, raincoat, or cold colors if the weather is rainy, the additive image of a snowman, or snowflake if the weather is snowy, the additive image of the moon, star, or fluorescent colors if the time is in the night time zone, and the additive image of a sea creature or the like if the location is a sea.

The image generation part 31*b* may generate the additive image for decorating to hide a dent or dirt if the target is recognized as a vehicle.

In addition, in a case where the target is recognized as a human, the image generation part 31*b* generates the additive image for decorating a human. Specifically, the image generation part 31*b* generates, as the additive image for decorating a head, body, face, arm, leg or the like of the human, an image of a hairstyle, clothes (including a fashion item such as eyeglasses, hat, or shoes), makeup, accessory and the like. At this time, the image generation part 31*b* generates, as the additive image for decorating a human depending on the user circumstance, for example, the additive image matching the user A favorite (favorite type of hairstyle, fashion, character, color, thing or the like of an opposite sex) on the basis of the preference information. By doing this, for example, while a man user wearing the HMD 1 sees a woman via the display unit 2 of the HMD 1, images of the man user' favorite hairstyle, clothes, makeup and the like are displayed with being superimposed on the woman. In a case where a woman recognized from the captured image is wearing eyeglasses but the man user favors a "woman not wearing eyeglasses", the image generation part 31*b* generates the additive image (that the eyeglasses are deleted from a woman face image) for decorating the face of the woman wearing eyeglasses so as to be without the eyeglasses.

In a case where the target is recognized as an animal, the image generation part 31*b* generates the additive image for decorating an animal. Specifically, the image generation part 31*b* generates, as the additive image for decorating a head, body or the like of an animal, an image of clothes for pet (including fashion item such as eyeglasses, hat, or shoes). At this time, the image generation part 31*b* generates, as the additive image for decorating an animal depending on the user circumstance, for example, the additive image matching the user A favorite (favorite fashion, character, color thing or the like) on the basis of the preference information.

The above thus describes the specific examples of the additive image for virtually decorating the target depending on the user circumstance by the image generation part 31*b*. The additive image described above is not limited to a still image and may be a moving picture.

The image generation part 31*b* according to the embodiment may refer to a time lapse circumstance of the target in addition to the above described user circumstance in generating the additive image. For example, if the target is divided, combined, or deformed, the image generation part 31*b* adds, eliminates, or changes at least a part of the additive image. If a smartphone, mobile phone, cup and the like which are recognized as the target are old things (a time has elapsed from when last used), the image generation part 31*b* generates the additive image such that the virtual decoration (seal, strap or the like) also looks old (that is, looks like in a state where the time has elapsed).

The image generation part 31*b* transmits to the HMD 1 or supplies to the image processing part 31*c* the generated additive image via the communication unit 33. The additive image transmitted to the HMD 1 is displayed, by way of adjustment by the main controller 10 and display controller 17 (image processing part) in the HMD 1, on the display unit 2 at a proper position corresponding to the target existing in the real space or a proper position on the captured image obtained by capturing the target.

The image processing part 31*c* adjusts the additive image generated by the image generation part 31*b* so as to be displayed at a proper position corresponding to the target existing in the real space or a predetermined position on the captured image obtained by capturing the target. The image processing part 31*c* adjusts also the display position of the additive image as well, and transmits via the communication unit 33 the additive image and the display position of the relevant additive image to the HMD 1. This allows the HMD 1 to, without the adjustment of the display position by the main controller 10 and the display controller 17 (image processing part), display the additive image on the display unit 2 according to the display position above. Alternatively, the HMD 1 may display on the display unit 2 the synthesized image (having the additive image synthesized on the captured image at a predetermined position) generated by the image processing part 31*c* in the server 30.

The image processing part 31*c* may move the additive image for virtually decorating the target depending on the target circumstance. For example, if the target is determined to be moving (swinging) on the basis of the captured image continuously captured, the image processing part 31*c* moves also the additive image for decorating the target depending on the movement of target. If the target is grasped by the user A, the image processing part 31*c* may move the additive image decorating the target depending on a motion of the user A (motion of the user A on the basis of the detection result by the gyro sensor provided to the HMD 1, or analysis result for the captured image). Accordingly, for example, while the user A wearing the HMD 1 is riding a train, if the target or the user A grasping the target moves depending on the swing of the train, the additive image (e.g., strap image) for the target displayed on the display unit 2 in the HMD 1 also moves and the virtual decoration is perceived more realistically. Moreover, for example, in a case where the target is a vehicle, the image processing part 31*c* may adjust the display position such that the additive image for decorating a wheel of a vehicle rotates along with a rotation of the wheel.

The adjustment processing for the display position of the additive image by the image processing part 31*c* described above may be performed by the display controller 17 (image processing part) in the HMD 1.

(Storing Unit)

The storage unit 32 is a member that records or plays back data with respect to a designated recording medium. The storage unit 32 is realized by a hard disk drive (HDD), for example. Obviously, various media such as flash memory or other solid-state memory, a memory card housing solid-state memory, an optical disc, a magneto-optical disc, and holographic memory are conceivable as the recording medium, and it is sufficient to configure the storage unit 32 to be able to execute recording and playback in accordance with the implemented recording medium.

The storing unit 32 according to the embodiment stores the user circumstance of each user, the captured image transmitted from each HMD 1, the model database used in recognizing the target from the captured image, the material image for generating the additive image and the like. The storing unit 32 stores the additive image which is generated by the image generation part 31*b* and displayed and superimposed on the captured image and may be used as a region sharable with another user (HMD worn by another user).

(Communication Unit)

The communication unit 33 sends and receives data to and from external equipment. The communication unit 33 communicates wirelessly with external equipment directly or via a network access point, according to a scheme such as a wireless local area network (LAN).

For example, the communication unit 33 communicates wirelessly with at least one or more HMDs 1 to receive the captured image captured by the image capture unit 3 which is provided to the HMD 1 (image display terminal) the user A has, or transmit the additive image generated by the image generation part 31*b* to the HMD 1.

3. OPERATION PROCESSING

The above thus specifically describes the basic configurations of the HMD 1 and server 30 included in the decoration system according to the embodiment. Subsequently, a description will be specifically given of an operation processing of the decoration system according to the embodiment with reference to FIG. 5 to FIG. 10B.

<3-1. First Decoration Processing>

Figure 5:
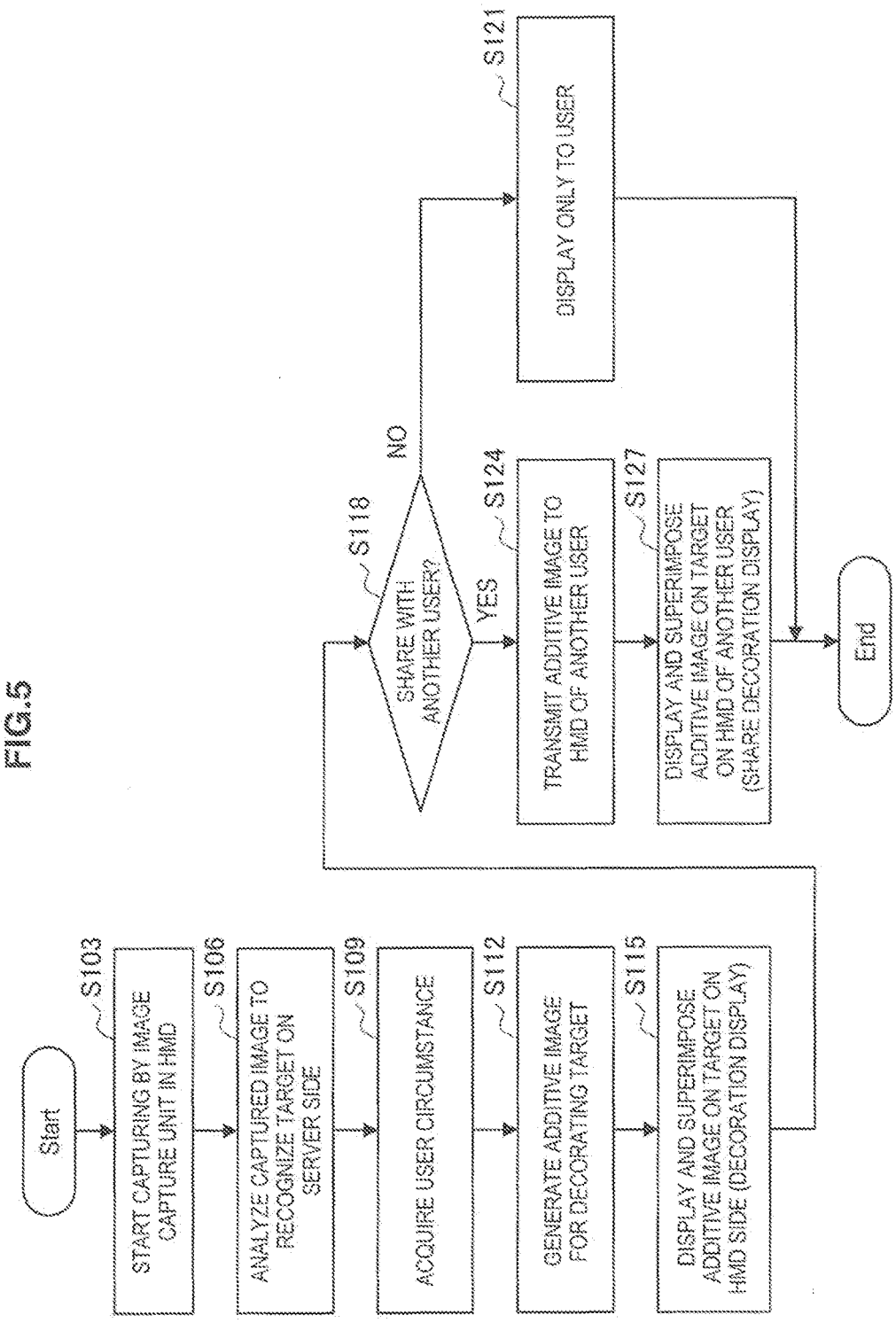
FIG. 5 is a flowchart illustrating a first decoration processing according to an embodiment.

FIG. 5 is a flowchart illustrating a first decoration processing according to the embodiment. As illustrated in FIG. 5, first, at step S103, the HMD 1 starts capturing the target by the image capture unit 3. The captured image is transmitted from the HMD 1 to the server 30.

Subsequently, at step S106, the recognition part 31a in the server 30 analyzes the captured image transmitted from the HMD 1 to recognize the target. Here. FIG. 6 illustrates a diagram for explaining a first decoration according to the embodiment. If a captured image P1 illustrated on the left in FIG. 6 is captured by the HMD 1, the recognition part 31a in the server 30 analyzes the captured image P1 to extract the target 40 by way of comparison with model data of the local feature amount data and the like and recognize that the target 40 is a cake. The recognition part 31a supplies the recognition result to the image generation part 31b.

Next, at step S109, the image generation part 31b in the server 30 acquires the user circumstance of the user A (user A seeing the target) who is a wearer of the HMD 1. The user circumstance may be acquired from the storing unit 32 in the server 30 or from the HMD 1.

Subsequently, at step S112, the image generation part 31b in the server 30 generates the additive image for decorating the target on the basis of the recognition result by the recognition part 31a and the user circumstance. Specifically, if the recognition part 31a recognizes the target 40 as a cake, the image generation part 31b generates the additive image for decorating a top surface or side surface of the cake. At this time, the image generation part 31b generates the additive image for cake decoration depending on the user circumstance of the user A. For example, the image generation part 31b generates the additive images D2 to D4 (refer to the right in FIG. 6) for decorating with a favorite character or thing (e.g., flower, ribbon) on the basis of the preference information of the user A (an example of the user circumstance). If the present date corresponds to the birthday of user A included in the biological information on the basis of the biological information of the user A (an example of the user circumstance), the image generation part 31b generates the additive image D1 (on the right in FIG. 6) for decorating with a message celebrating the birthday.

The additive image generated by the image generation part 31b is transmitted to the HMD 1.

Next, at step S115, the display controller 17 (image processing part) in the HMD 1 adjusts the display position such that the additive images D1 to D4 transmitted from the server 30 are displayed on the display unit 2 at proper positions corresponding to the target 40 (real object or captured image) as illustrated on the right in FIG. 6. This achieves the virtual decoration on the target 40 with the additive images D1 to D4.

Next, at step S118, the main controller 10 in the HMD 1 determines whether or not the decoration (additive images D1 to D4) on the target 40 is to be shared with another user. It may be determined whether to share with another user on the basis of whether or not a sharing mode is set by the user in the HMD 1. Moreover, another user may be specified another user or unspecified another user.

Then, if determined to not share with another user (S118/No), at step S121 the additive images D1 to D4 for decorating the target 40 are displayed only in the HMD 1 of the user A.

On the other hand, if determined to share with another user (S118/Yes), at step S124 information for sharing and displaying the additive images D1 to D4 which are displayed in the HMD 1 of the user A is transmitted from the HMD 1 or from the server 30 to the HMD of another user. The HMD 1 of another user has the same basic configuration as the HMD 1 according to the embodiment explained with reference to FIG. 1 to FIG. 3.

Then, at step S127, the additive images D1 to D4 are displayed and superimposed on the target 40 in the HMD of another user to achieve sharing of decoration display (sharing and displaying). Here, the sharing and display may be, for example, displaying on the display unit in the HMD of another user an image where the additive images D1 to D4 for decorating the target 40 are synthesized on the captured image P1 of the target 40 captured by the HMD 1 of the user A. Alternatively, the sharing and displaying may be, if another user is present around the user A and see the same target 40, displaying the additive images D1 to D4 on the display unit in the HMD of another user at proper positions so as to decorate the target 40 captured by the HMD of another user. Further, at step S124 above, the information for sharing and displaying the additive images D1 to D4 is transmitted from the HMD 1 or server 30 to the HMD of another user, but the embodiment is not limited to this and the storing unit 32 in the server 30 may be accessed from the HMD of another user. In this case, the storing unit 32 stores the additive images D1 to D4 which are generated by the image generation part 31b and displayed to be superimposed on the captured image, and is used as a region sharable with another user (HMD worn by another user).

The above thus specifically describes the first decoration processing according to the embodiment. Note that at step S112 above, the additive image generated by the image generation part 31b in the server 30 is transmitted to the HMD 1, but the decoration processing according to the embodiment is not limited to this, and the generated additive image may be supplied to the image processing part 31c in the server 30, for example. The image processing part 31c adjusts the display position of the additive image and outputs display position information. Then, the server 30 transmits the generated additive image and the display position information to the HMD 1. This allows the display controller 17 in the HMD 1 to display the additive images D1 to D4 on the display unit 2 at a proper position corresponding to the target 40 according to the display position information transmitted from the server 30.

<3-2. Second Decoration Processing>

Next, a description will be given of a second decoration processing according to the embodiment with reference to FIG. 7 to FIG. 9. The second decoration processing shows a processing for the additive image depending on variation such as division, combination, or deformation of the target. The image capture unit 3 in the HMD 1 according to the embodiment continuously captures the target 40 to virtually decorate the target 40 in real time. Accordingly, if the target 40 is food and drink such as a cake illustrated in FIG. 1, since the food and drink are decreased as eating progresses, the HMD 1 changes the virtual decoration depending on the variation of the target 40 to allow the decoration to be perceived more realistically.

Specifically, as will be described later with reference to FIG. 8, the additive image D2 (refer to FIG. 6) is deleted depending on a target 40' having varied as eating progresses, and further an additive image D1' with a part of the additive image D1 (refer to FIG. 6) being deleted is displayed in real time. Such elimination or change of at least a part of the additive image due to the target variation may be carried out by the display controller 17 (image processing part) in the HMD 1, or newly generated by the image generation part 31*b* in the server 30. The display controller 17 (image processing part) or image generation part 31*b* according to the embodiment may add, eliminate, or vary at least of a part of the additive image depending on the change of the user circumstance (behavior circumstance, environmental information, biological information, usage condition, or the like). Note that the usage condition of the user is a usage condition of the target by user and is similar to the above time lapse circumstance of the target. For example, the display controller 17 (image processing part) or the image generation part 31*b* eliminates or changes in real time at least a part of the additive image for virtually decorating the relevant target depending on the varying target on the basis of the eating progress on the basis of the behavior circumstance of the user. Moreover, the display controller 17 (image processing part) or the image generation part 31*b* adds, eliminates, or changes in real time at least a part of the additive image for virtually decorating the target depending on the variation of the date or location on the basis of the environmental information of the user. Further, the display controller 17 (image processing part) or the image generation part 31*b* adds, eliminates or changes in real time at least a part of the additive image for virtually decorating the target depending on the variation of the health condition or feeling of the user on the basis of the biological information of the user.

Figure 7:
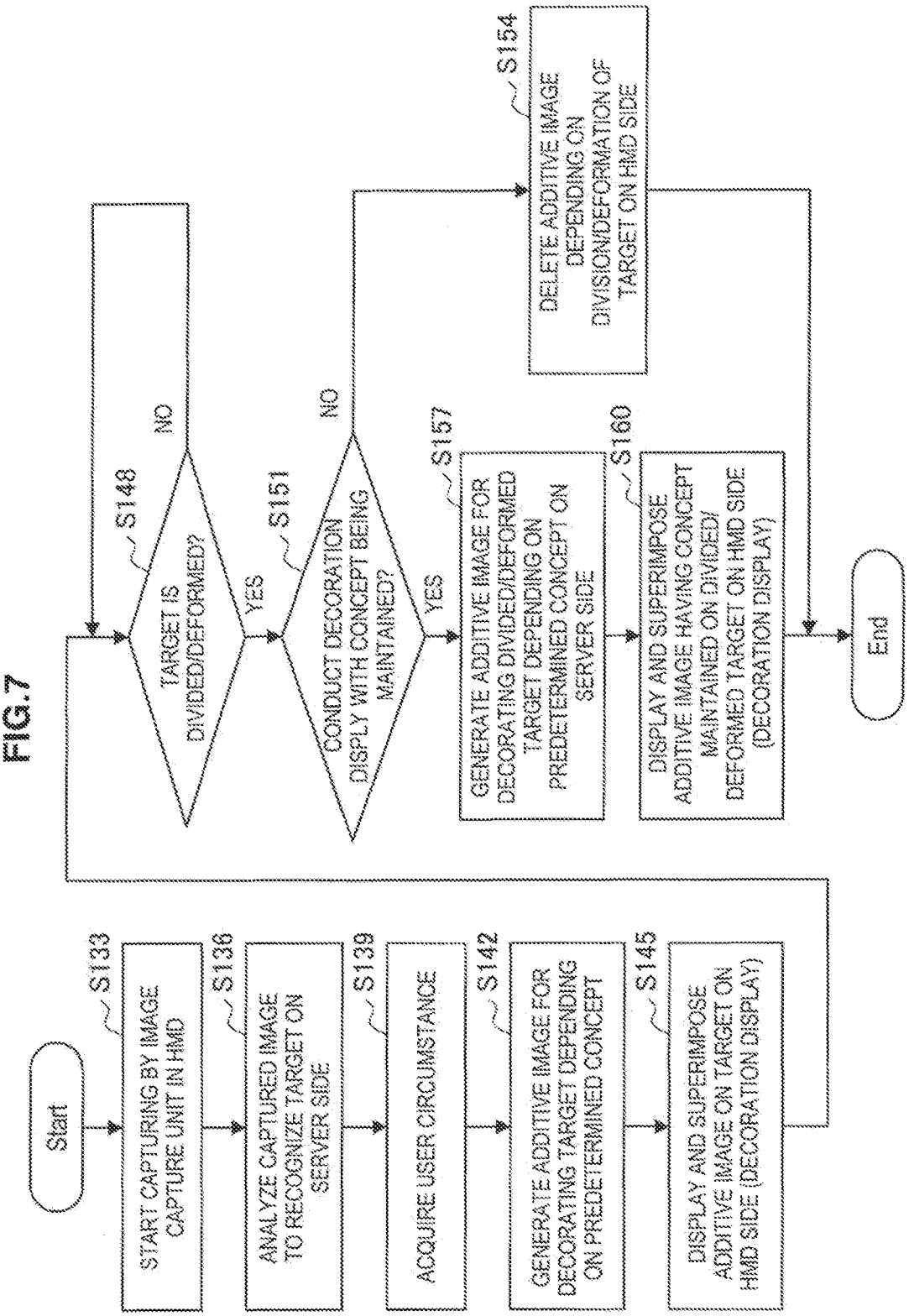
FIG. 7 is a flowchart illustrating a second decoration processing according to an embodiment.
Figure 8:
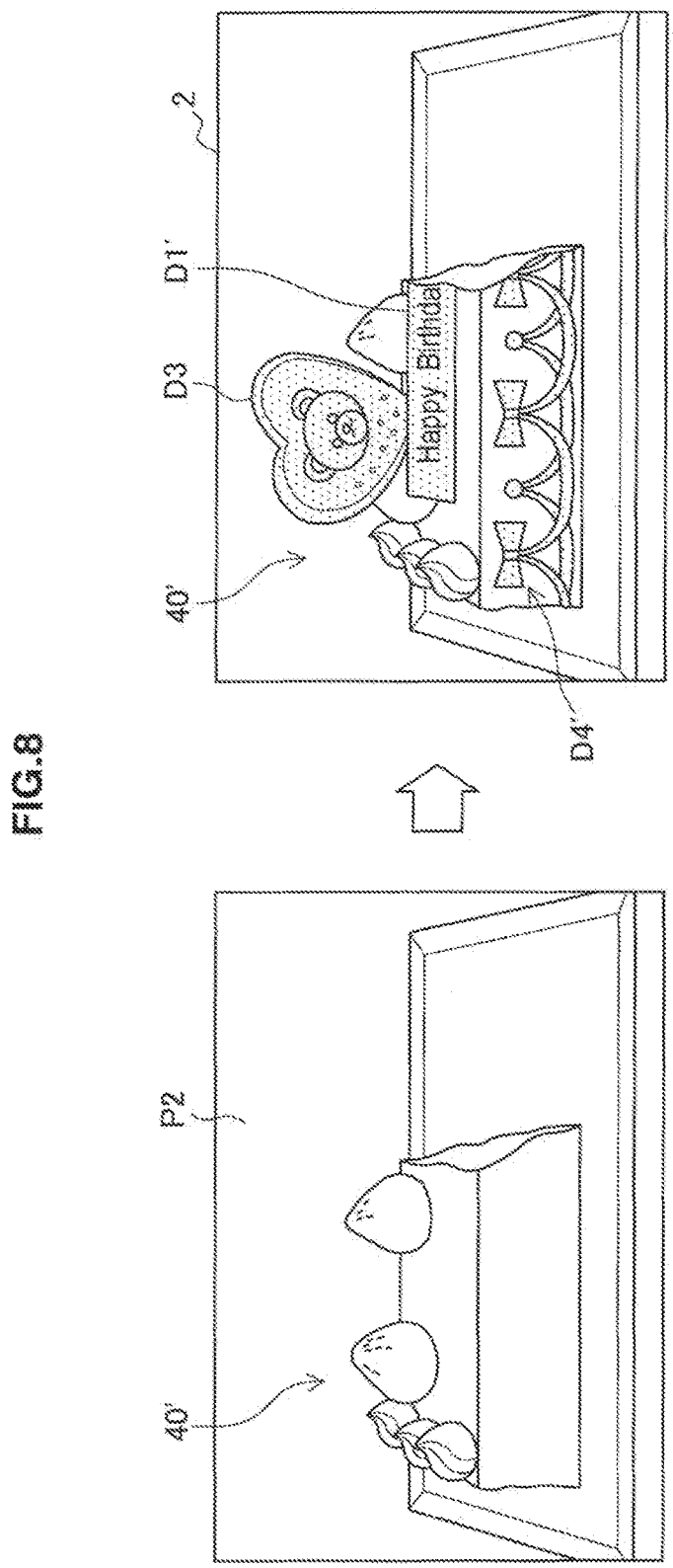
FIG. 8 is a diagram for explaining variation of an additive image by the second decoration processing according to an embodiment.

On the other hand, when the virtual decoration is deleted as illustrated in FIG. 8 as eating progresses, the virtual decoration can be perceived more realistically but the gorgeous decoration is difficult to enjoy. Therefore, in the second decoration processing, the virtual decoration is made to be changed so as to maintain (continue) a concept for the decoration, continuously providing also the decoration on the basis of the first concept even if the eating progresses. Hereinafter, a description will be specifically given of the second decoration processing like this with reference to FIG. 7.

FIG. 7 is a flowchart illustrating the second decoration processing according to the embodiment. As illustrated in FIG. 7, first, at step S133, the HMD 1 start capturing the target by the image capture unit 3. The captured image is transmitted from the HMD 1 to the server 30.

Subsequently, at step S136, the recognition part 31*a* in the server 30 analyzes the captured image transmitted from the HMD 1 to recognize the target. For example, also in the second decoration processing, if the captured image P1 illustrated on the left in FIG. 6 is captured by the HMD 1, the recognition part 31*a* in the server 30 analyzes the captured image P1 to recognize that the target 40 is a cake. The recognition part 31*a* supplies the recognition result to image generation part 31*b*.

Next, at step S139, the image generation part 31*b* in the server 30 acquires the user circumstance of the user A (user A seeing the target) who is a wearer of the HMD 1. The user circumstance may be acquired from the storing unit 32 in the server 30 or from the HMD 1.

Subsequently, at step S142, the image generation part 31*b* in the server 30 generates the additive image for decorating the target depending on a predetermined concept on the basis of the recognition result by recognition part 31*a* and the user circumstance. The predetermined concept is an intention, purpose, main theme or the like for decorating the target, and is determined by the image generation part 31*b* on the basis of the user circumstance. For example, if it is found that the user A likes a bear (an example of a specified character) and a flower from the preference information of the user A, as well as it is found that the present date is the birthday from the date of birth (included in the biological information) of the user A, the image generation part 31*b* determines that "celebration for the birthday using the bear and flower" is the concept for decoration. Then, the image generation part 31*b* generates the additive images D1 to D4 as illustrated on the right in FIG. 6 for decorating the target 40 (cake) according to the relevant concept. The additive image generated by the image generation part 31*b* is transmitted to the HMD 1.

Next, at step S145, the display controller 17 (image processing part) in the HMD 1 adjusts the display position such that the additive images D1 to D4 transmitted from the server 30 are displayed on the display unit 2 at proper positions corresponding to the target 40 (real object or captured image) as illustrated on the right in FIG. 6. This achieves the virtual decoration on the target 40 with the additive images D1 to D4.

Next, at step S148, the recognition part 31*a* in the server 30 determines whether or not the target 40 has undergone variation such as division (including division into small portions), combination, or deformation. In the embodiment, since the HMD 1 continuously captures the target 40 and sequentially transmits the captured image to the server 30, the recognition part 31*a* in the server 30 can analyze the captured image sequentially transmitted to determine the variation of the target 40 in real time. Specifically, as illustrated on the left in FIG. 8, for example, the recognition part 31*a* can recognize that the target 40 has undergone the variation on the basis of a captured image P2 of the target 40' having varied as the eating progresses.

If determined to have undergone the variation (S148/Yes), at step S151 the image generation part 31*b* in the server 30 determines whether or not the decoration is displayed with the concept being maintained. It may be determined whether to maintain the concept on the basis of whether or not a concept maintaining mode is set by the user in the HMD 1, or depending on whether or not at step S142 above the additive image is generated depending on a predetermined concept.

If the decoration with the concept being maintained is not made (S151/No), at step S154 the display controller 17 (image processing part) in the HMD 1 displays additive images D1' and D4' with a part thereof being deleted on the display unit 2 depending on the target 40' having varied as illustrated on the right in FIG. 8. The additive images D1' and D4' with a part thereof being deleted may be generated (edited) by the image generation part 31*b* in the server 30 or generated (edited) by the display controller 17 (image processing part) in the HMD 1 on the basis of the additive images D1 and D4.

On the other hand, if the decoration with the concept being maintained is made (S151/Yes), at step S157 the image generation part 31*b* in the server 30 generates the additive image depending on a predetermined concept (concept determined at step S142 above) for decorating the target 40' having varied. For example, in the example illustrated on the right in FIG. 8, in a case where a predetermined concept is the above described "celebration for the birthday using the bear and flower", the concept could not be maintained if the flower additive image D2 (refer to FIG. 6) was deleted and a part of the additive image D1' including the message for celebrating the birthday was also deleted. For this reason, the image generation part 31*b* generates the additive image (e.g., additive images D1" and D2" illustrated in FIG. 9) for decorating the target 40' having varied with a predetermined concept (e.g., "celebration for the birthday using the bear and flower") being maintained. The generated additive image is transmitted to the HMD 1.

Figure 9:
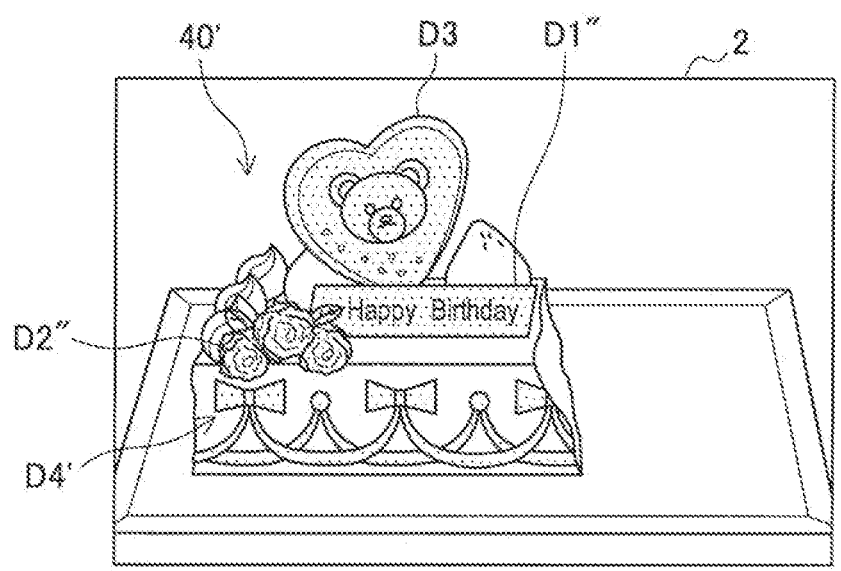
FIG. 9 is a diagram for explaining the variation of an additive image by the second decoration processing according to an embodiment.

Next, at step S160, the display controller 17 (image processing part) in the HMD 1 displays on the display unit 2 the additive images D1" and D2" to be superimposed on the target 40' having varied to maintain the concept as illustrated in FIG. 9. When the decoration example illustrated in FIG. 9 is compared with the decoration example illustrated on the right in FIG. 8, the additive image D1" has the massage for celebrating the birthday expressed thereon without any lack and the flower additive image D2 which is deleted in the example illustrated on the right in FIG. 8 is newly displayed and superimposed on the target 40' as the additive image D2". In this way, the HMD 1 can achieve the virtual decoration also on the target 40' having varied from the target 40 with a predetermined concept "celebration for the birthday using the bear and flower" being maintained. Note that the example illustrated in FIG. 9 has a part of the additive image D4' left deleted, which has no particular effect on maintaining the concept, and a state having a part deleted which matches a state of the target 40' allows the decoration to be perceived more realistically.

<3-3. Third Decoration Processing>

The second decoration processing above determines a predetermined concept with respect to the target 40 (cake) having no decoration depending on the user circumstance to generate the additive image depending on a predetermined concept. However, a case may be conceived where a decoration has been already made actually on the target as the real object depending on a certain concept, and in such a case if the target undergoes variation such as division, combination, or deformation, the decoration may be broken or removed. For example, when the cake has a specified character mainly decorated, if the cake is cut or eaten increasingly, the specified character decoration (decoration for food or non-food) is removed or cut to be broken. Therefore, in the decoration system according to the embodiment, in the case where the decoration depending on a certain concept has been already made actually on the target as real object, if the target undergoes variation such as division, combination, or deformation, the virtual decoration is made so as to maintain the relevant concept. This makes it possible to maintain the concept for the decoration of the target even if the target undergoes variation such as division, combination, or deformation. Hereinafter, a specific explanation will be given with reference to FIG. 10A and FIG. 10B.

Figure 10A:
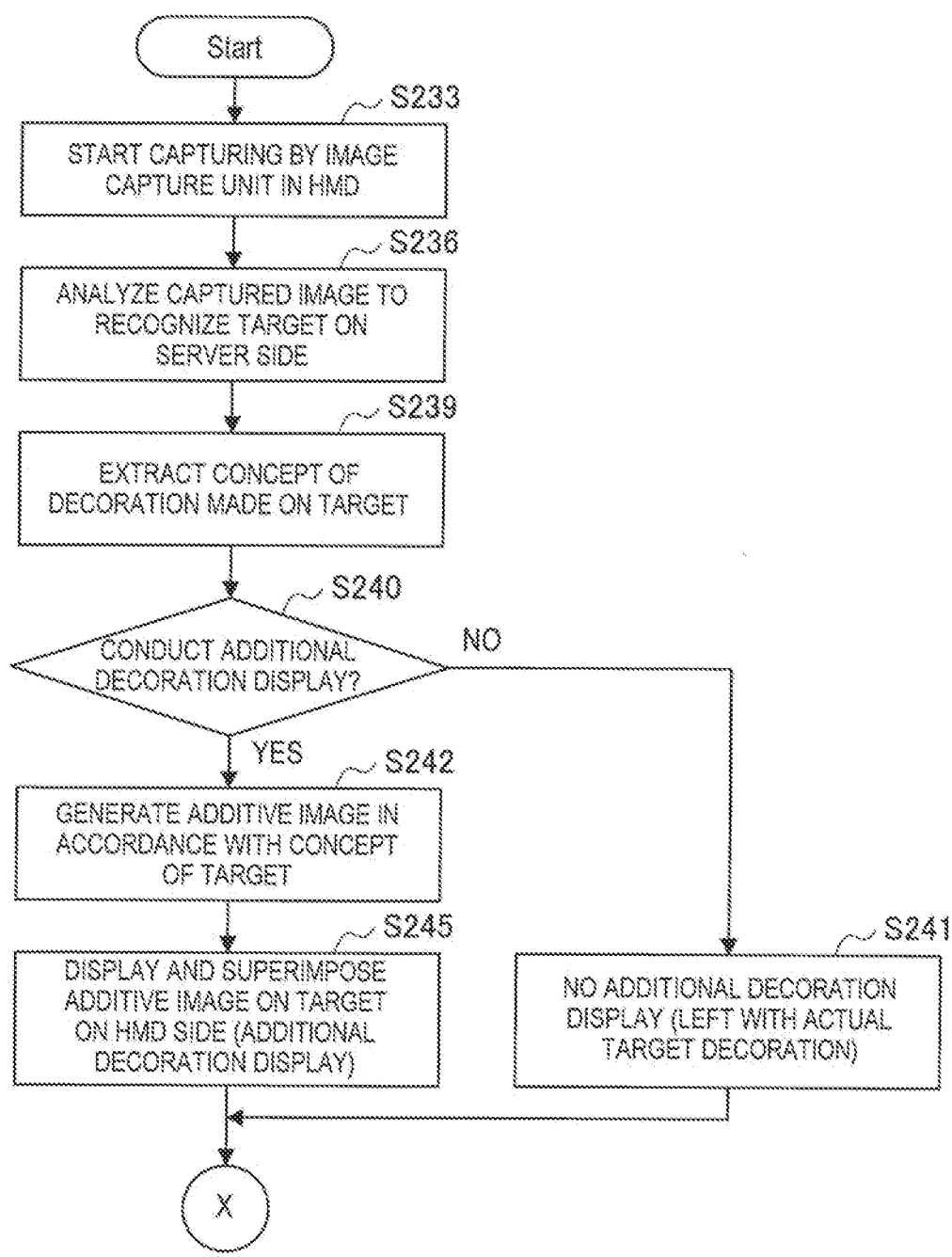
FIG. 10A is a flowchart illustrating a third decoration processing according to an embodiment.
Figure 10B:
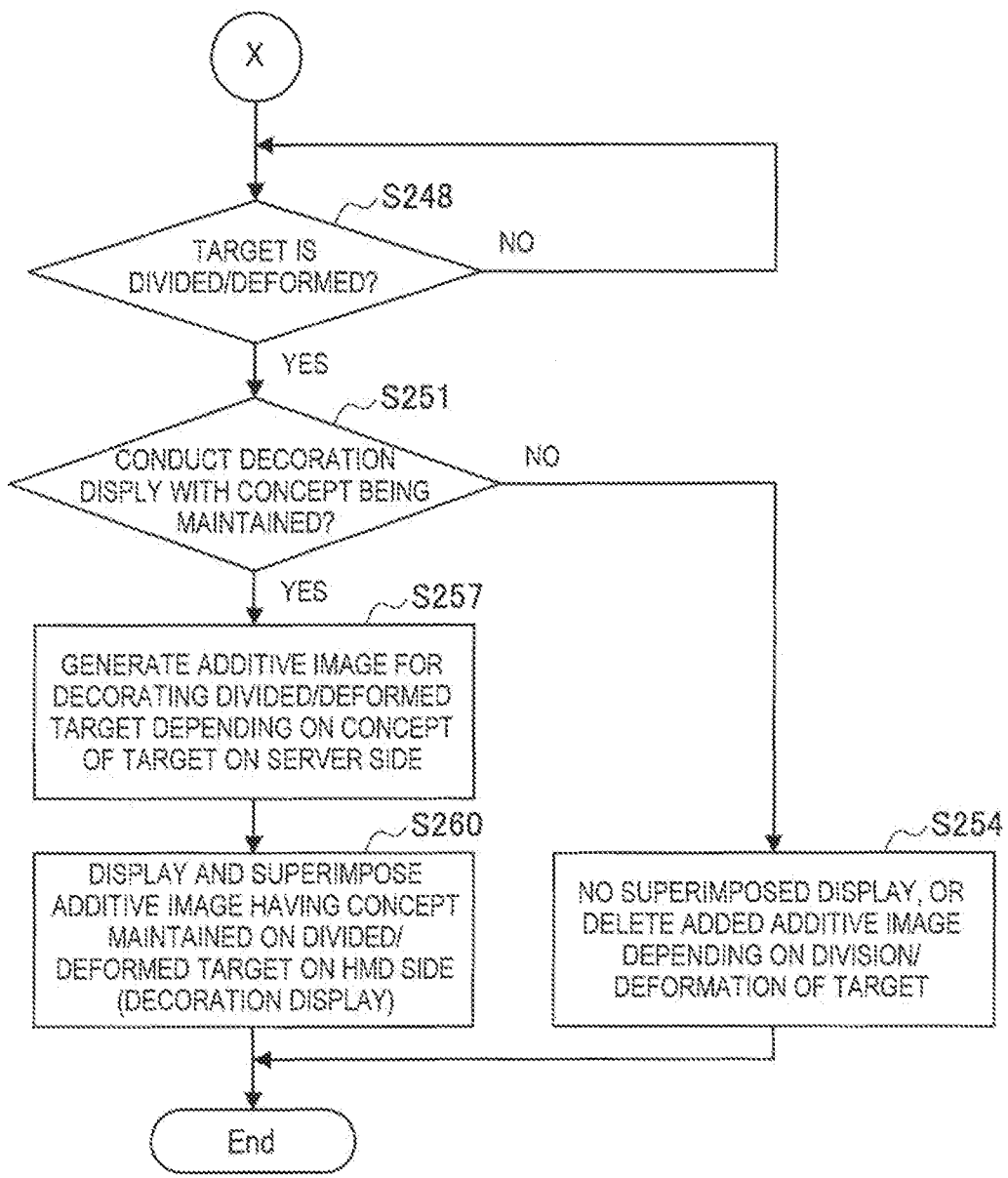
FIG. 10B is a flowchart illustrating the third decoration processing according to an embodiment.

FIG. 10A and FIG. 10B are a flowchart illustrating a third decoration processing according to the embodiment. As illustrated in FIG. 10A, first, at step S233, the HMD 1 starts capturing the target by the image capture unit 3. The captured image is transmitted from the HMD 1 to the server 30.

Subsequently, at step S236, the recognition part 31a in the server 30 analyzes the captured image transmitted from the HMD 1 to recognize the target.

Next, at step S239, the recognition part 31a in the server 30 extracts the concept for the decoration which is actually made on the target as the real object on the basis of the analysis result for the captured image For example, in a case where the target is a cake and the relevant cake is actually decorated with a cookie or sugar candy having a specified character designed thereon, or an accessory (specified character figure) for non-food, the "decoration on the basis of specified character" is extracted as a concept Subsequently, at step S240, the main controller 31 in the server 30 determines whether to conduct an additional decoration display. Whether to conduct the additional decoration display is determined depending on whether additional decoration is instructed in the HMD 1 by the user A, for example.

In the case where the additional decoration display is not conducted (S240/No), at step S241 the main controller 31 in the server 30 does not generate the additive image by the image generation part 31b under the determination of no additional decoration display. Accordingly, the user A wearing the HMD 1 sees the target as the real object as it is with the actual decoration.

On the other hand, in the case where additional decoration display is conducted (S240/Yes), at step S242 the image generation part 31b in the server 30 generates the additive image in accordance with the concept of the target extracted at step S239 above. For example, if "decoration based on specified character" is extracted as a concept, the image generation part 31b generates the additive image for decoration relating to the relevant specified character. The generated additive image is transmitted to the HMD 1.

Next, at step S245, the display controller 17 (image processing part) in the HMD 1 displays the additive image transmitted from the server 30 on the display unit 2 at a proper position corresponding to the target. This allows the user A wearing the HMD 1 to see the target as the real object in a state where the actual decoration is added with the virtual decoration.

Subsequently, a step S248 illustrated in FIG. 10B, the recognition part 31a in the server 30 determines whether or not the target 40 has undergone the variation such as division, combination, or deformation. In the embodiment, since the HMD 1 continuously captures the target 40 and sequentially transmits the captured image to the server 30, the recognition part 31a in the server 30 can analyze the captured image sequentially transmitted to determine the variation of the target 40 in real time.

If determined to have undergone the variation (S248/Yes), at step S251 the image generation part 31b in the server 30 determines whether or not the decoration is displayed with the concept being maintained. It may be determined whether to maintain the concept on the basis of whether or not a concept maintaining mode is set by the user in the HMD 1, or depending on whether or not at step S239 above the concept of target is successfully extracted.

If determined to not display the decoration with the concept being maintained (S251/No), at step S254 the display controller 17 (image processing part) in the HMD 1 does not conduct the displaying and superimposing the additive image for maintaining the concept. Alternatively, if the additional decoration display is conducted at step S245 above, the display controller 17 (image processing part) displays the added additive image with a part or all thereof being deleted depending on the variation (division/deformation) of the target.

On the other hand, if determined to display the decoration with the concept being maintained (S251/Yes), at step S257 the image generation part 31b in the server 30 generates the additive image depending on the concept of the target (concept determined at step S239 above) for decorating the varied target.

For example, in the case where the target is a cake and the concept target is the "decoration on the basis of specified character", a case may be conceived where a cake which is cut or partially eaten has the decoration of the specified character removed or broken. In this case, the image generation part 31b generates the additive image for maintaining the decoration on the basis of the specified character. For example, the image generation part 31b generates as the additive image an image (captured image) of a cookie or sugar candy having a specified character designed thereon, or an accessory (specified character figure) for non-food which is actually decorated initially on the cake. In addition, in a case where the cake as the target is divided into plural pieces, the image generation part 31b generates a plurality of additive images for decoration such that the cut pieces of cake may be decorated with the same image of the specified character. The generated additive image is transmitted to the HMD 1.

Next, at step S260, the display controller 17 (image processing part) in the HMD 1 displays the additive image transmitted from the server 30 (additive image for maintaining of the concept of the target) on the display unit 2 at a proper position corresponding to the varied target. This makes it possible for the HMD 1 to achieve the virtual decoration for maintaining the concept the target, for example, "decoration on the basis of specified character" even if the target having the actual decoration made thereon varies.

4. ANOTHER EMBODIMENT

The decoration system described above according to an embodiment of the present disclosure (particularly, the first and second decoration processings) recognizes the captured target and generates the additive image for decoration depending on the user circumstance (user A preference information, biological information, or the like) of the user A seeing the target. However, the decoration system according to the embodiment is not limited to the above described examples, and can generate the additive image for decoration depending on a target circumstance, for example.

In other words, if a first user sees a second user (target) via the HMD 1, the additive image for decoration depending on the user circumstance (target circumstance) of the second user is generated and the relative additive image is displayed on the display unit 2 in the HMD 1 so as to be superimposed on the second user. This makes it possible to show anyone else (first user) the decoration in which hobbies and diversions, health condition and the like of the second user are reflected, and for the second user to be seen in the decoration matching his/her hobbies and diversions, health condition and the like by the anyone else. Hereinafter, a description will be given of the decoration system according to another embodiment which conducts such a decoration depending on the target circumstance with reference to FIG. 11 and FIG. 12.

Figure 11:
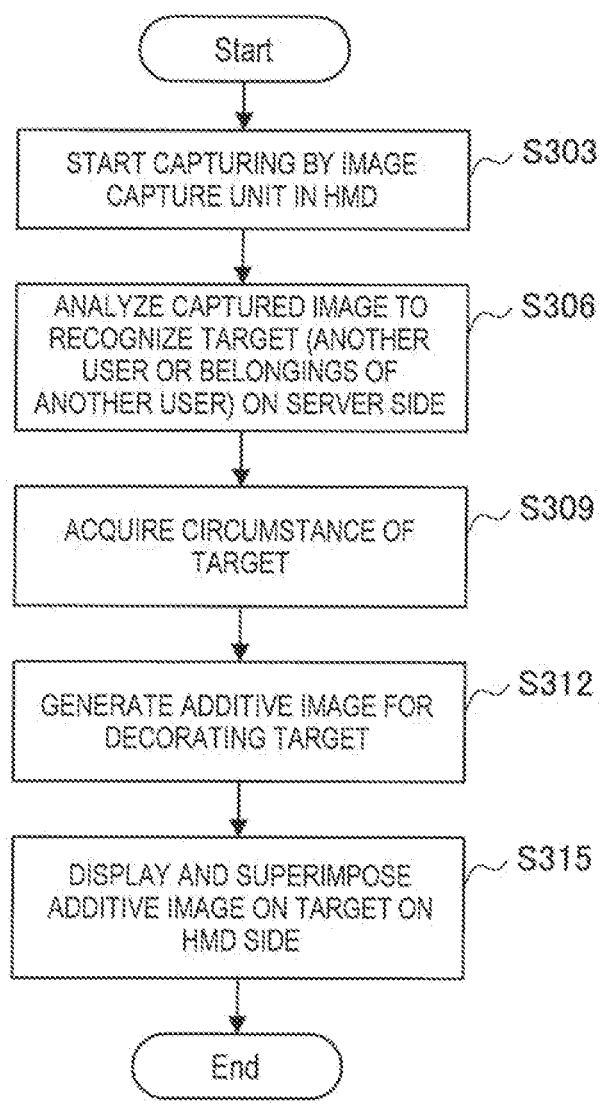
FIG. 11 is a flowchart illustrating an operation processing of a decoration system according to another embodiment.

FIG. 11 is a flowchart illustrating an operation processing of the decoration system according to another embodiment. As illustrated in FIG. 11, at step S303, the HMD 1 starts capturing the target by the image capture unit 3. The captured image is transmitted from the HMD 1 to the server 30.

Subsequently, at step S306, the recognition part 31a in the server 30 analyzes the captured image transmitted from the HMD 1 to recognize the target. Here, FIG. 12 illustrates a diagram for explaining the decoration depending on the target circumstance according to another embodiment. If a captured image P3 illustrated on the left in FIG. 12 is captured by the HMD 1, the recognition part 31a in the server 30 recognizes the captured image P3 to extract a target 42 by way of comparison with the mode data of the local feature amount data and the like and recognizes that the target 42 is a person (another user). Further, the recognition part 31a analyzes the captured image P3 to extract targets 43 and 44 and recognize that the target 43 and 44 are belongings of another user. The recognition part 31a supplies the recognition result to the image generation part 31b.

Next, at step S309, the image generation part 31b in the server 30 acquires a circumstance (user circumstance) of the target 42 (another user). The user circumstance of another user may be acquired from the storing unit 32 in the server 30 or from the HMD if another user is wearing the relevant HMD. Note that another user is recognized by way of face recognition by the recognition part 31a using a face image of another user included in the captured image, for example.

Subsequently, at step S312, the image generation part 31b in the server 30 generates the additive image for decorating the target on the basis of the recognition result by the recognition part 31a and the target circumstance. Specifically, if the recognition part 31a recognizes the target 42 as a person (another user), the image generation part 31b generates the additive image for decorating a head, body, arm, leg and further the belongings of the person. In this case, the image generation part 31b generates the additive image for decoration depending on the circumstance of the target 42 (user circumstance of another user). For example, the image generation part 31b generates additive images D10, D12 and D13 for decorating with a favorite artist or character on the basis of the preference information (an example of the user circumstance) of another user. As illustrated on the right in FIG. 12, the additive image D10 is a strap image of the character another user (target 42) likes, the additive image D12 is a seal image of the character another user likes, and the additive image D13 is an image of a hairstyle the same as the artist another user likes.

Additionally, the image generation part 31b can also generate, on the basis of the behavior plan (included in behavior information as an example of the user circumstance) of another user, the additive image in which a state after the behavior is conceived. For example, in a case where another user is scheduled to have a perm or color treatment in a hair salon (which is determined from Web reservation information at the hair salon or schedule information of another user), a hairstyle image after the scheduled perm or color treatment is generated.

The additive image generated by the image generation part 31b is transmitted to the HMD 1.

Next, at step S315, the display controller 17 (image processing part) in the HMD 1 adjusts the display positions such that the additive images D10 to D13 transmitted from the server 30 are displayed on the display unit 2 at proper positions corresponding to the targets 42 to 44 as illustrated on the right in FIG. 12. This achieves the virtual decoration using the additive images D10 to D13 depending on the circumstance of the target 42 (another user).

Note that in a case where another user (target 42) is also wearing the HMD according to the embodiment, when another user sees his/her belongings (targets 43 and 44), the HMD may conduct the virtual decoration depending on the hobbies and diversions (user circumstance) of another user himself/herself (refer to the above first and second decoration processings). Therefore, the user A who sees another user (target 42) wearing such a HMD is virtually decorated by the HMD 1 depending on the hobbies and diversions of another user (decoration processing illustrated in FIG. 11) to be caused to practically share the virtual decoration with another user.

5. CONCLUSION

As described above, the decoration system according to the embodiment can achieve the virtual decoration on the captured target in which the user circumstance of the user seeing the target is reflected by use of the display unit 2 in the HMD 1 worn by the user. Specifically, the virtual decoration is made on the target which matches the user circumstance such as the user's favorite, health condition, feeling, behavior and the like, for example, increasing satisfaction of the user.

According to the decoration system of the embodiment, the virtual decoration depending on the user circumstance like this can be also shared with another user (specified/unspecified another user).

According to the decoration system of the embodiment, if the target undergoes the variation such as division, deformation, or combination, a part or all or the virtual decoration is deleted or the like depending on the variation in real time, allowing the user to conceive the virtual decoration as if the virtual decoration is an actual decoration existing in the real space.

According the decoration system according to the embodiment, even if the target virtually decorated by use of a predetermined concept on the basis of the user circumstance undergoes the variation such as division, combination, or deformation, the additive image for maintaining a predetermined concept can be displayed and superimposed on the target in real time, further improving the satisfaction of the user.

According to the decoration system of the embodiment, even if the target already decorated actually undergoes the variation such as division, combination, or deformation, the additive image for maintaining of the concept of the target can be displayed and superimposed on the target in real time, further improving convenience.

According to the decoration system of another embodiment, in the case where the target is another user, the decoration depending on the user circumstance of another user can be superimposed on another user (real object or captured image), allowing the user to enjoy the virtual decoration in which the hobbies and diversions and the like of another user are reflected.

The preferred embodiments of the present disclosures have been described above with reference to the accompanying drawings, whilst the present technology is not limited to the above examples, of course. A person having ordinary skill in the art may find various alternations and modifications within the scope of the appended claims, and it should be understood that they will naturally come under the technical scope of the present disclosure.

For example, it is possible to create a computer program for causing hardware such as a CPU. ROM, and RAM built into the HMD 1 or the server 30 to exhibit the functionality of the HMD 1 or the server 30 discussed earlier. A computer-readable storage medium made to store such a computer program is also provided.

In the above embodiments, the decoration system (cloud type) including the HMD 1 (an example of the image display terminal) and the server 30 (an example of the image processor) is described, but the decoration system according to the present disclosure is not limited to the configuration including the HMD 1 and the server 30. For example, a configuration where the HMD 1 includes the functions of the recognition part 31a in the server 30, image generation part 31b, and image processing part 31c as well as the data stored in the storing unit 32 can achieve the decoration system according to the above embodiments in the single HMD 1.

Additionally, the present technology may also be configured as below.

(1) An image processor including;
a recognition part configured to recognize a captured target on the basis of a captured image; and
an image generation part configured to generate an additive image for decorating the target depending on a user circumstance of a user seeing the target and a recognition result by the recognition part.

(2) The image processor according to (1), wherein
the user circumstance is biological information, emotion information, preference information, behavior circumstance, or environmental information of the user.

(3) The image processor according to (1) or (2), further including:
a reception part configured to receive the captured image captured by an image capture unit that is provided to an image display terminal which the user has; and
a transmission part configured to transmit the additive image generated by the image generation part to the image display terminal.

(4) The image processor according to (3), wherein
the reception part receives the user circumstance from the image display terminal.

(5) The image processor according to any one of (1) to (4), wherein
in a case where the target is recognized as a food or a drink, at least a part or all of the additive image is eliminated or changed by the image generation part or an image processing part depending on a progress of eating and drinking on the basis of the behavior circumstance of the user.

(6) The image processor according to any one of (1) to (4), wherein
the image generation part or the image processing part adds, eliminates, or changes at least a part of the additive image depending on the environmental information about an environment where the user is located.

(7) The image processor according to any one of (1) to (4), wherein
the image generation part or the image processing part adds, eliminates, or changes at least a part of the additive image depending on the biological information of the user or usage condition.

(8) The image processor according to any one of (1) to (7), wherein
the image generation part or the image processing part adds, eliminates, or changes at least a part of the additive image depending on a time lapse circumstance of the target in addition to the user circumstance.

(9) The image processor according to any one of (1) to (8), further including:
a storage medium configured to share the additive image or an image having the additive image superimposed on the captured image with another user.

(10) The image processor according to any one of (1) to (9), further including:
an image processing part configured to adjust such that the additive image is displayed at a position corresponding to the target existing in a real space or at a predetermined position on the captured image obtained by capturing the target.

(11) The image processor according to any one of (1) to (9), wherein
the additive image is transmitted to the image display terminal which the user has, and is adjusted so as to be displayed at a position corresponding to the target existing in a real space or at a predetermined position on the captured image obtained by capturing the target by an image processing part included in the image display terminal.

(12) The image processor according to any one of (1) to (11), wherein
in a case where the target is recognized as another user or a belonging of another user, the image generation part generates the additive image for decorating the target depending on a user circumstance of the another user.
(13) The image processor according to any one of (1) to (12), wherein
the image generation part increases kinds of the additive image for decorating the target depending on payment from the user.
(14) The image processor according to any one of (1) to (13), wherein
in a case where the target is divided, combined or deformed, the image generation part generates the additive image for decorating the target after the division, combination or deformation so as to maintain a concept of the additive image having decorated the target before the division, combination or deformation.
(15) The image processor according to (14), wherein
in a case where the target is a food or a drink, at least a part of the additive image is eliminated or changed with the concept of the additive image being maintained by the image generation part or an image processing part depending on a progress of eating and drinking.
(16) The image processor according to any one of (1) to (13), wherein
in a case where the target is divided, combined, or deformed, the image generation part generates the additive image for decorating the target after the division, combination or deformation so as to maintain a concept of the target before the division, combination or deformation.
(17) A non-transitory computer-readable storage medium having a program stored therein, the program causing a computer to function as:
a recognition part configured to recognize a captured target on the basis of a captured image; and
an image generation part configured to generate an additive image for decorating the target depending on a user circumstance of a user seeing the target and a recognition result by the recognition part.

What is claimed is:
1. An image processor comprising:
circuitry configured to:
recognize a captured target on the basis of a captured image;
generate an additive image for decorating the target depending on a user circumstance of a user seeing the target and a recognition result;
modify a position of objects of the additive image so as to maintain a concept of the target before the division, combination or deformation, when the captured target is to convey a concept and the captured target is divided, combined, or deformed; and
delete or do not modify the objects when the objects of the additive image are not generated on the basis of the concept,
wherein the user circumstance is based on environment information that includes present time, weather and location of the user.
2. The image processor according to claim 1, wherein
the user circumstance is further based on biological information, emotion information, preference information, or behavior circumstance of the user.

3. The image processor according to claim 1,
wherein the circuitry is further configured to:
receive the captured image that is provided to an image display terminal which the user has; and
transmit the generated additive image to the image display terminal.
4. The image processor according to claim 3, wherein
the circuitry is further configured to receive the user circumstance from the image display terminal.
5. The image processor according to claim 1, wherein
in a case where the target is recognized as a food or a drink, the circuitry is further configured to eliminate or change at least a part or all of the additive image depending on a progress of eating and drinking on the basis of the behavior circumstance of the user.
6. The image processor according to claim 1, wherein
the circuitry is further configured to add, eliminate or change at least a part of the additive image depending on the environmental information about an environment where the user is located.
7. The image processor according to claim 1, wherein
the circuitry is further configured to add, eliminate, or change at least a part of the additive image depending on the biological information of the user or usage condition.
8. The image processor according to claim 1, wherein
the circuitry is further configured to add, eliminate, or change at least a part of the additive image depending on a time lapse circumstance of the target in addition to the user circumstance.
9. The image processor according to claim 1, further comprising:
a storage medium configured to share the additive image or an image having the additive image superimposed on the captured image with another user.
10. The image processor according to claim 1,
wherein the circuitry is further configured to adjust such that the additive image is displayed at a position corresponding to the target existing in a real space or at a predetermined position on the captured image obtained by capturing the target.
11. The image processor according to claim 1, wherein
the additive image is transmitted to an image display terminal which the user has, and is adjusted so as to be displayed at a position corresponding to the target existing in a real space or at a predetermined position on the captured image.
12. The image processor according to claim 1, wherein
in a case where the target is recognized as another user or a belonging of another user, the circuitry is further configured to generate the additive image for decorating the target depending on a user circumstance of the another user.
13. The image processor according to claim 1, wherein
the circuitry is further configured to increase kinds of the additive image for decorating the target depending on payment from the user.
14. The image processor according to claim 1, wherein
in a case where the target is divided, combined or deformed, the circuitry is further configured to generate the additive image for decorating the target after the division, combination or deformation so as to maintain a concept of the additive image having decorated the target before the division, combination or deformation.
15. The image processor according to claim 14, wherein
in a case where the target is a food or a drink, at least a part of the additive image is eliminated or changed with the concept of the additive image being maintained by the circuitry depending on a progress of eating and drinking.

16. The image processor according to claim 1, wherein the target is recognized as a mobile terminal.

17. The image processor according to claim 1, wherein the target is recognized as a vehicle.

18. The image processor according to claim 1,
wherein the user circumstance is further based on biological information, wherein the biological information is a health condition of the user.

19. The image processor according to claim 1, wherein
the user circumstance is further based on biological information, preference information, behavior circumstance, and environmental information of the user.

20. The image processor according to claim 1, wherein the circuitry is further configured to generate the additive image for decorating the target based on a time lapse circumstance of the target.

21. A non-transitory computer-readable storage medium having a program stored therein, the program causing a computer having circuitry to execute a method, the method comprising:
recognizing a captured target on the basis of a captured image;
generating an additive image for decorating the target depending on a user circumstance of a user seeing the target and a result of the recognition,
modifying a position of objects of the additive image so as to maintain a concept of the target before a division, combination or deformation, when the captured target is to convey a concept and the captured target is divided, combined, or deformed; and
deleting or do not modifying the objects when the objects of the additive image are not generated on the basis of the concept,
wherein the user circumstance is based on environment information that includes present time, weather and location of the user.

* * * * *